(12) United States Patent
Aria et al.

(10) Patent No.: US 10,734,639 B2
(45) Date of Patent: Aug. 4, 2020

(54) CARBON NANOTUBES—GRAPHENE HYBRID STRUCTURES FOR SEPARATOR FREE SILICON—SULFUR BATTERIES

(71) Applicant: CALIFORNIA INSTITUTE OF TECHNOLOGY, Pasadena, CA (US)

(72) Inventors: Adrianus I. Aria, Cambridge (GB); Morteza Gharib, Altadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 1097 days.

(21) Appl. No.: 14/322,139

(22) Filed: Jul. 2, 2014

(65) Prior Publication Data

US 2015/0010788 A1 Jan. 8, 2015

Related U.S. Application Data

(60) Provisional application No. 61/939,996, filed on Feb. 14, 2014, provisional application No. 61/842,511, filed on Jul. 3, 2013.

(51) Int. Cl.
*H01M 10/0525* (2010.01)
*H01M 4/134* (2010.01)
(Continued)

(52) U.S. Cl.
CPC ........... *H01M 4/362* (2013.01); *H01M 4/13* (2013.01); *H01M 4/38* (2013.01); *H01M 4/386* (2013.01);
(Continued)

(58) Field of Classification Search
CPC .......... H01M 4/362; H01M 4/13; H01M 4/38; H01M 4/625
See application file for complete search history.

(56) References Cited

U.S. PATENT DOCUMENTS

| 4,052,539 A | 10/1977 | Shropshire et al. |
| 4,959,281 A | 9/1990 | Nishi et al. |

(Continued)

FOREIGN PATENT DOCUMENTS

JP 06-236768 8/1994

OTHER PUBLICATIONS

WO, PCT/US2014/045201 ISR, dated Oct. 28, 2014.
(Continued)

*Primary Examiner* — James Lee
(74) *Attorney, Agent, or Firm* — One LLP

(57) ABSTRACT

Provided herein are electrochemical systems and related methods of making and using electrochemical systems. Electrochemical systems of the invention implement novel cell geometries and composite carbon nanomaterials based design strategies useful for achieving enhanced electrical power source performance, particularly high specific energies, useful discharge rate capabilities and good cycle life. Electrochemical systems of the invention are versatile and include secondary lithium ion cells, such as silicon-sulfur lithium ion batteries, useful for a range of important applications including use in portable electronic devices. Electrochemical cells of the present invention also exhibit enhanced safety and stability relative to conventional state of the art lithium ion secondary batteries by using prelithiated active materials to eliminate the use of metallic lithium and incorporating carbon nanotube and/or graphene, composite electrode structures to manage residual stress and mechanical strain arising from expansion and contraction of active materials during charge and discharge.

31 Claims, 8 Drawing Sheets

(51) Int. Cl.

| | | |
|---|---|---|
| *H01M 4/70* | (2006.01) | |
| *H01M 4/78* | (2006.01) | |
| *H01M 4/36* | (2006.01) | |
| *H01M 4/38* | (2006.01) | |
| *H01M 10/058* | (2010.01) | |
| *H01M 4/13* | (2010.01) | |
| *H01M 4/62* | (2006.01) | |
| *B82Y 40/00* | (2011.01) | |
| *H01M 4/02* | (2006.01) | |
| *B82Y 30/00* | (2011.01) | |

(52) U.S. Cl.
CPC ......... *H01M 4/625* (2013.01); *H01M 10/058* (2013.01); *H01M 10/0525* (2013.01); *B82Y 30/00* (2013.01); *B82Y 40/00* (2013.01); *H01M 2004/021* (2013.01); *Y10S 977/742* (2013.01); *Y10S 977/842* (2013.01); *Y10S 977/948* (2013.01); *Y10T 29/49108* (2015.01)

(56) References Cited

U.S. PATENT DOCUMENTS

| | | | |
|---|---|---|---|
| 5,451,477 | A | 9/1995 | Omaru et al. |
| 5,510,212 | A | 4/1996 | Delnick et al. |
| 5,538,814 | A | 7/1996 | Kamauchi et al. |
| 5,763,120 | A | 6/1998 | Saidi et al. |
| 6,302,540 | B1 | 10/2001 | Katzman et al. |
| 6,306,540 | B1 | 10/2001 | Hiroi et al. |
| 6,489,055 | B1 | 12/2002 | Ichihashi et al. |
| 6,680,143 | B2 | 1/2004 | Thackeray et al. |
| 6,852,446 | B2 | 2/2005 | Barbarich |
| 8,586,242 | B2 | 11/2013 | Chou et al. |
| 8,697,284 | B2 | 4/2014 | Shinya et al. |
| 8,748,084 | B2 | 6/2014 | Fukuda |
| 2010/0119938 | A1* | 5/2010 | Nitzan .................. H01M 2/145 429/199 |
| 2011/0111283 | A1* | 5/2011 | Rust, III ............. H01M 4/0428 429/163 |
| 2011/0183206 | A1 | 7/2011 | Davis et al. |
| 2011/0281156 | A1 | 11/2011 | Boren et al. |
| 2012/0028123 | A1* | 2/2012 | Asari ...................... H01G 11/36 429/231.8 |
| 2012/0121986 | A1* | 5/2012 | Balu ....................... B82Y 30/00 429/231.1 |
| 2013/0019468 | A1 | 1/2013 | Ramasubramanian et al. |
| 2013/0045418 | A1* | 2/2013 | Oguni .................... B82Y 30/00 429/211 |
| 2013/0209880 | A1* | 8/2013 | Nozue ................. H01M 4/1393 429/211 |
| 2013/0252101 | A1 | 9/2013 | Zhou et al. |
| 2013/0309565 | A1* | 11/2013 | He ........................ H01M 4/668 429/211 |

OTHER PUBLICATIONS

WO, PCT/US2014/045201 IPRP, dated Jan. 5, 2016.
Aria, A.I., et al., "Reversible Tuning of the Wettability of Carbon Nanotube Arrays: The Effect of Ultraviolet/Ozone and Vacuum Pyrolysis Treatments", Langmuir, 2011, vol. 27, pp. 9005-9011.
Broussely, M., "Lithium-Ion Batteries for EV, HEV and Other Industrial Applications", Lithium Batteries, Science and Technology, 2004, Chapter 21, pp. 645-685, edited by G.A. Nazri and G. Pistoia, Kluer Academic Publishers.
Cui, LF, et al., "Light-Weight Free-Standing Carbon Nanotube-Silicon Films for Anodes of Lithium Ion Batteries", ACS Nano, 2010, vol. 4, No. 7, pp. 3671-3678.
Dörfler, S., et al., "High capacity vertical aligned carbon nanotube/sulfur composite cathodes for lithium-sulfur batteries", Chem. Commun., 2012, vol. 48, pp. 4097-4099.
Evanoff, K., et al., "Towards Ultrathick Battery Electrodes: Aligned Carbon Nanotube-Enabled Architecture", Adv. Mater., 2012, vol. 24, pp. 533-537.
Forney, M.W, et al., "High performance silicon free-standing anodes fabricated by low-pressure and plasma-enhanced chemical vapor deposition onto carbon nanotube electrodes", Journal of Power Sources, 2013, vol. 228, pp. 270-280.
Forney, M.W., et al., "Prelithiation of Silicon-Carbon Nanotube Anodes for Lithium Ion Batteries by Stabilized Lithium Metal Powder (SLMP)", Nano Letters, 2013, vol. 13, pp. 4158-4163.
Gogotsi, Y., et al., "True Performance Metrics in Electrochemical Energy Storage", Science, 2011, vol. 334, pp. 917-918.
He, G., et al., "High "C" rate Li—S cathodes: sulfur imbibed bimodal porous carbons", Energy Environ. Sci., 2011, vol. 4, pp. 2878-2883.
Katar, S.L., et al., "Silicon Encapsulated Carbon Nanotubes", Nanoscale Res Lett, 2010, vol. 5, pp. 74-80.
Li, S., et al., "Vertically Aligned Carbon Nanotubes Grown on Graphene Paper as Electrodes in Lithium-Ion Batteries and Dye-Sensitized Solar Cells", Adv. Energy Mater., 2011, vol. 1, pp. 486-490.
Liu, N., et al., "Prelithiated Silicon Nanowires as an Anode for Lithium Ion Batteries", ACS Nano, 2011, vol. 5, No. 8, pp. 6487-6493.
Manthiram, A., "Materials Aspects: An Overview", Lithium Batteries, Science and Technology, 2004, Chapter 1, pp. 3-41, edited by G.A. Nazri and G. Pistoia, Kluer Academic Publishers.
Pu, NW, et al., "Dispersion of graphene in aqueous solutions with different types of surfactants and the production of graphene films by spray or drop coating", Journal of the Taiwan Institute of Chemical Engineers, 2012, vol. 43, pp. 140-146.
Seel, J.A., et al., "Electrochemical Intercalation of $PF_6$ into Graphite", Journal of The Electrochemical Society, 2000, vol. 147, No. 3, pp. 892-898.
Su, YS, et al., "Self-weaving sulfur-carbon composite cathodes for high rate lithium-sulfur batteries", Phys. Chem. Chem. Phys., 2012, vol. 14, pp. 14495-14499.
Wang, B., et al., "Adaptable Silicon-Carbon Nanocables Sandwiched between Reduced Graphene Oxide Sheets as Lithium Ion Battery Anodes", ACS Nano, 2013, vol. 7, No. 2, pp. 1437-1445.
Yang, Y., et al., "New Nanostructured $Li_2S$/Silicon Rechargeable Battery with High Specific Energy", Nano Letters, 2010, vol. 10, pp. 1486-1491.
Zhang, X., et al., "Dispersion of graphene in ethanol using a simple solvent exchange Method", Chem. Commun., 2010, vol. 10, pp. 7539-7541.
Zheng, G., et al., "Hollow Carbon Nanofiber-Encapsulated Sulfur Cathodes for High Specific Capacity Rechargeable Lithium Batteries", Nano Letters, 2011, vol. 11, pp. 4462-4467.

\* cited by examiner

US 10,734,639 B2

CARBON NANOTUBES—GRAPHENE HYBRID STRUCTURES FOR SEPARATOR FREE SILICON—SULFUR BATTERIES

CROSS-REFERENCE TO RELATED APPLICATIONS

This application claims the benefit of and priority to U.S. Provisional Patent App. No. 61/842,511, filed Jul. 3, 2013, and U.S. Provisional Patent App. No. 61/939,996, filed Feb. 14, 2014, each of which is hereby incorporated by reference to the extent not inconsistent herewith.

STATEMENT REGARDING FEDERALLY SPONSORED RESEARCH OR DEVELOPMENT

Not applicable.

BACKGROUND OF INVENTION

Over the past few decades revolutionary advances have been made in electrochemical storage and conversion devices significantly expanding the capabilities and applications of these systems. Current state of the art electrochemical storage and conversion devices implement cell designs specifically engineered to achieve performance attributes enabling requirements and operating conditions supporting diverse applications including portable electronics, transportation, energy, lighting, sensing and communications. Despite the development and widespread adoption of this suite of advanced electrochemical storage and conversion systems, significant pressure continues to stimulate research to expand the functionality of these systems, thereby enabling an even wider range of device applications. The rapid and ongoing growth in the demand for high power portable electronic products, for example, has created enormous interest in developing safer, light weight secondary batteries capable of achieving higher energy densities and cycling performance.

Many recent advances in electrochemical storage and conversion technology are directly attributable to discovery of new materials for key battery components. Lithium battery technology, for example, continues to rapidly develop, at least in part, due to the discovery of novel electrode and electrolyte materials for these systems. From the pioneering discovery and optimization of intercalation host materials for positive electrodes, such as fluorinated carbon materials and nanostructured transition metal oxides, to the development of high performance non-aqueous electrolytes, the implementation of novel materials strategies for lithium battery systems have revolutionized their design and performance capabilities. Furthermore, development of intercalation host materials for negative electrodes in these systems has led to the discovery and commercial implementation of lithium ion secondary batteries exhibiting high capacity, good stability and useful cycle life. As a result of these advances, lithium based battery technology is currently widely adopted for use in a significant range of applications including primary and secondary electrochemical cells for portable electronic systems.

Commercial primary lithium battery systems typically utilize a lithium metal negative electrode for generating lithium ions which are transported during discharge through a liquid phase or solid phase electrolyte and undergo intercalation reaction at a positive electrode comprising an intercalation host material. Dual intercalation lithium ion secondary batteries have also been developed, wherein lithium metal is replaced with a lithium ion intercalation host material for the negative electrode, such as carbons (e.g., graphite, coke, etc.), metal oxides, metal nitrides and metal phosphides. Simultaneous lithium ion insertion and de-insertion reactions allow lithium ions to migrate between positive and negative intercalation electrodes during discharge and charging. Incorporation of a lithium ion intercalation host material for the negative electrode also has the significant advantage of avoiding the use of metallic lithium which is susceptible to safety issues upon cycling attributable to the highly reactive nature and non-epitaxial deposition properties of metallic lithium.

The element lithium has a unique combination of properties that make it attractive for use in high performance electrochemical cells. First, it is the lightest metal in the periodic table having an atomic mass of 6.94 AMU. Second, lithium has a very low electrochemical oxidation/reduction potential (i.e., −3.045 V vs. NHE (normal hydrogen reference electrode). This unique combination of properties enables lithium based electrochemical cells to achieve high specific capacities. Advances in materials strategies and electrochemical cell designs for lithium battery technology have realized electrochemical cells capable of providing useful device performance including: (i) high cell voltages (e.g. up to about 3.8 V), (ii) substantially constant (e.g., flat) discharge profiles, (iii) long shelf-life (e.g., up to 10 years), and (iv) compatibility with a range of operating temperatures (e.g., −20 to 60 degrees Celsius). As a result of these beneficial characteristics, lithium and lithium ion batteries are currently the most widely adopted power sources in portable electronic devices, such as cellular telephones and portable computers. The following references are directed generally to lithium and lithium ion battery systems which are hereby incorporated by reference in their entireties: U.S. Pat. Nos. 4,959,281; 5,451,477; 5,510,212; 6,852,446; 6,306,540; and 6,489,055; and "Lithium Batteries Science and Technology" edited by Gholam-Abbas Nazri and Gianfranceo Pistoia, Kluer Academic Publishers, 2004.

Despite these advances, significant challenges remain to be addressed for the continued development of lithium ion batteries including issues relating to the cost, electrochemical performance and safety of these systems. Advances in cathode active materials, such as $LiMn_2O_4$, $LiCoO_2$ and $LiFePO_4$, have accessed improved device performance. [See, e.g., U.S. Pat. Nos. 5,763,120; 5,538,814; 8,586,242; 6,680,143 and 8,748,084]. Such advanced cathode active materials, however, are still limited in the overall energy densities achievable and also bring into play significant issues with overall conductivity, cycling performance and toxicity for some of the materials. High capacity anode active materials, such as nanostructured Si, Sb, Sn, Ge and alloys thereof, access higher specific capacities and allow for elimination of the use of metallic lithium to avoid problems associated with dendritic growth. [See, e.g., US Publication 2013/0252101 and U.S. Pat. No. 8,697,284]. Such advanced anode active materials, however, are susceptible to large changes in volume upon charging and discharge which can cause structural degradation upon cycling resulting in capacity fading, poor cycle life, lower system efficiency and increased internal resistance. Moreover, many commercial lithium ion systems implementing advanced cathode and anode active materials typically exhibit actual specific energies 4 to 12 times smaller that the specific energy of the electrodes due to the significant weight of other battery components such as separators, electrolytes, current collectors, connectors and packaging components.

As will be clear from the foregoing, there exists a need in the art for secondary electrochemical cells for a range of important device applications including the rapidly increasing demand for high performance portable electronics. Specifically, secondary electrochemical cells are needed that are capable of providing useful cell voltages, specific capacities and cycle life, while at the same time exhibiting good stability and safety. A need exists for alternative cell geometries and intercalation based electrochemical cells that eliminate or mitigate safety issues inherent to the use of lithium in lithium ion battery systems.

SUMMARY OF THE INVENTION

Provided herein are electrochemical systems and related methods of making and using electrochemical systems. Electrochemical systems of the invention implement novel cell geometries and composite carbon nanomaterials-based design strategies useful for achieving enhanced electrical power source performance, particularly high specific energies, useful discharge rate capabilities and good cycle life. Electrochemical systems of the invention are versatile and include secondary lithium ion cells, such as silicon-sulfur lithium ion batteries, useful for a range of important applications including use in portable electronic devices. Electrochemical cells of the present invention also exhibit enhanced safety and stability relative to conventional state of the art lithium ion secondary batteries by using prelithiated active materials to eliminate the use of metallic lithium and incorporating carbon nanotube and/or graphene, composite electrode structures to manage residual stress and mechanical strain arising from expansion and contraction of active materials during charge and discharge.

In an embodiment, electrochemical cells of the invention integrate carbon nanotube templated composite structures for positive and negative electrodes to achieve overall cell geometries that eliminate the need for a conventional separator component, thereby increasing specific capacity. Moreover, carbon nanotube templating approaches of the invention are also complementary for incorporation of high performance active materials, such silicon and sulfur, in useful form factors for negative and positive electrodes, for example, by providing high internal conductivity and an effective means of reducing residual stress resulting from expansion and contraction of materials during charge and discharge cycles. In addition, electrochemical cells of some embodiments integrate graphene enclosure structures for active materials to reduce, or outright prevent, transport of certain reaction products that can cause degradation of the electrolyte, such as polysulfides generated during charge and discharge using a sulfur active material for the positive electrode. In addition, electrochemical cells of some embodiments integrate composite electrode structures having a combination of silicon and sulfur active materials, thereby supporting high electrochemical performance while avoiding use of toxic and/or unstable materials.

In an aspect, the invention provides an electrochemical cell comprising: (i) a negative electrode comprising a first assembly of carbon nanotubes supporting a silicon active material; (ii) a positive electrode comprising a second assembly of carbon nanotubes supporting a sulfur active material; and (iii) an electrolyte provided between the positive electrode and the negative electrode; the electrolyte capable of conducting charge carriers; wherein the first assembly of carbon nanotubes and the second assembly of carbon nanotubes are physically separated from each other and are supported by a common surface. In an embodiment, for example, the electrochemical cell is a lithium ion battery, for example, wherein the charge carriers are $Li^+$ ions, and wherein the positive electrode and the negative electrode are capable of accommodating the $Li^+$ ions during charge or discharge of the electrochemical cell. In an embodiment, for example, the silicon active material, the sulfur active material or both are prelithiated materials, for example, active materials that have been electrochemically prelithiated. Incorporation of prelithiated active materials in the present electrochemical cells is a strategy useful to avoid safety and performance issues arising from formation of dendrites of metallic lithium during charge and discharge cycling.

Composite electrodes comprising active materials supported by carbon nanotube assemblies enable a wide range of cell geometries providing benefits for electrochemical performance and safety. In an embodiment, for example, the nanotube assembly-based composite structures of the invention allow electrodes to be physically separated from each other without the use of a conventional separator component, such as a permeable membrane, thereby enabling electrochemical cells exhibiting high specific capacities. In an embodiment, for example, the nanotube assembly-based composite structures of the invention allow electrodes to be patterned in a wide range of spacing filling geometries supporting good discharge rate performance such as strip geometries, interleaved geometries and spiral geometries. In an embodiment, for example, the nanotube assembly-based composite structures of the invention allow electrodes to be patterned in a geometry wherein the typical load on the electrochemical cell does not generate force acting upon the positive or negative electrode in the direction of the opposing electrode. In an embodiment, the first assembly of carbon nanotubes and the second assembly of carbon nanotubes are physically separated from each other by at least 10 µm, optionally at least 100 µm, for example, as provided by one or more void regions between positive and negative electrodes occupied by electrolyte.

The invention includes cell geometries wherein positive and negative electrodes are supported by a common substrate, such as a polymer, inorganic, ceramic, metallic or composite substrate. In some embodiments, for example, the electrochemical cell further comprises a substrate, wherein the common surface supporting the first assembly of carbon nanotubes and the second assembly of carbon nanotubes is an external surface of the substrate. The external surface supporting positive and negative electrodes can be in a planar or nonplanar configuration, such as a cylindrical, folded, bent or wound configuration. In an embodiment, for example, the first assembly of carbon nanotubes and the second assembly of carbon nanotubes are provided on the external surface of the substrate or on one or more intermediate structures provided between the first assembly of carbon nanotubes and/or the second assembly of carbon nanotubes and the external surface of the substrate.

In an embodiment, the first and second carbon nanotube assemblies are independently in electrical contact, and optionally in physical contact, with one or more current collector structures supported by, and optionally in physical contact with, the substrate. In an embodiment, for example, the first assembly of carbon nanotubes is provided on a first current collector supported by the external surface of the substrate and the second assembly of carbon nanotubes is provided on a second current collector supported by the external surface of the substrate. In an embodiment, for example, the electrochemical cell further comprises a first graphene electrical interconnect and a second graphene interconnect, wherein the first graphene electrical interconnect is provided between the first assembly of carbon nanotubes and the first current collector; and wherein the second graphene electrical interconnect is provided between the second assembly of carbon nanotubes and the second current collector. Electrochemical cells of the invention may comprise a range of current collectors, such as carbon current collectors, metallic current collectors, particulate current collectors, etc.

Electrodes of the present cells may be provided in a wide range of space filing geometries, for example, accessed by a range of patterning techniques for carbon nanotube assemblies, including patterning carbon nanotube growth catalysts on substrates and/or current collectors using lithographic and/or liquid phase deposition approaches. In an embodiment, for example, the first assembly of carbon nanotubes is provided as one or more first strips supported by the substrate and the second assembly of carbon nanotubes is provided as one or more second strips supported by the substrate. Using nanotube pattern techniques known in the art, the physical dimensions (e.g. thickness, width, length, etc.), physical properties (e.g., nanotube surface concentration, density, intertube spacing, etc.), position and shape of strips of nanotubes comprising first and second assemblies can be accurately defined, including processing involving first spatially patterning a substrate, interconnect and/or current collector with nanotube growth catalyst followed by exposure to gas phase or liquid phase precursors resulting in growth of nanotube arrays or networks localized to regions of the substrate spatially defined by the pattern of catalyst.

In certain embodiments, such first and second set of strips define the physical dimensions, shape, separation and overall form factors of the positive and negative electrodes. In an embodiment, for example, the first strips are separated from the second strips by at least 10 µm, optionally for some applications at least 50 µm, and optionally for some applications at least 100 µm. In certain embodiments, the first strips and the second strips independently have a geometry characterized by widths selected from the range of 10 µm to 1 mm, optionally for some applications 100 µm to 1 mm, and lengths selected from the range of 30 µm to 3 mm, optionally for some applications 300 µm to 3 mm. In an embodiment, for example, the first strips and the second strips are arranged in a space filling geometry. In an embodiment, for example, the first strips and the second strips are arranged in a parallel geometry, an interleaved geometry, a coiled geometry, a nested geometry or a spiral geometry.

Carbon nanotube assemblies impart beneficial mechanical, electronic and chemical properties of positive and negative electrodes of the present electrochemical cells. A variety of carbon nanotube compositions and geometries are useful in the nanotube assemblies of the invention. In an embodiment, for example, the carbon nanotubes of the first assembly and the second assembly comprise single walled carbon nanotubes, multiwalled carbon nanotubes or a mixture of both single walled carbon nanotubes and multiwalled carbon nanotubes. Use of multiwalled carbon nanotubes in nanotube assemblies for positive and negative electrodes is preferred for certain embodiments given their high conductivity and larger physical dimensions relative to single walled carbon nanotubes. Thus, the invention includes composite electrode structures comprising carbon nanotubes that are exclusively multiwalled nanotubes. In an embodiment, for example, the carbon nanotubes of the first assembly and the second assembly comprise primarily, and optionally solely, metallic carbon nanotubes. In an embodiment, for example, the carbon nanotubes of the first assembly and the second assembly are independently characterized by radial dimensions (e.g., diameter) selected over the range of 5 nm to 100 nm, optionally for some applications 20 nm to 100 nm, and length dimensions selected over the range of 10 µm to 5 mm, optionally for some applications 100 µm to 5 mm. In an embodiment, for example, the carbon nanotubes of the first assembly and the second assembly are independently characterized by radial dimensions (e.g., diameter) greater or equal to 20 nm and length dimensions greater or equal to 1000 µm. In an embodiment, for example, the carbon nanotubes of the first assembly and the second assembly are independently characterized by an average surface concentration greater than or equal to 25 nanotubes $\mu m^{-2}$ and optionally greater than or equal to 100 nanotubes $\mu m^{-2}$.

Nanotube assemblies of the invention include carbon nanotube arrays, including arrays comprising spatially aligned carbon nanotubes, and/or a carbon nanotube networks, including random nanotube networks. In an embodiment, for example, the carbon nanotubes of the first assembly comprise a first array of vertically aligned carbon nanotubes and the carbon nanotubes of the second assembly comprise a second array of vertically aligned carbon nanotubes. A used herein, vertically aligned refers to alignment of nanotubes in an assembly along axes intersecting, and optionally orthogonal, to a supporting substrate or current collector. In an embodiment, for example, the vertically aligned carbon nanotubes of the first array and the second array extend in one or more directions away from the common surface. In an embodiment, for example, the vertically aligned carbon nanotubes of the first array and the second array extend in a common direction away from the common surface. In an embodiment, for example, the vertically aligned carbon nanotubes of the first array and the second array are independently characterized by an average interspacing between adjacent nanotubes selected over the range of 10 nm to 200 nm. In some embodiments, the nanotube assemblies are characterized by a configuration having a plurality of nanotube crossings or a configuration characterized by carbon nanotubes in a substantially parallel orientation (e.g., deviations from absolute parallelism of less than 20%).

In an embodiment, for example, the carbon nanotubes of the first and second assemblies provides a mechanical scaffold to manage or minimize forces acting on the electrodes that can cause degradation, loss of conductivity and/or mechanical failure. In an embodiment, for example, the carbon nanotubes of the first assembly provide a mechanical scaffold capable of accommodating stress resulting from expansion of the silicon active material during charging or discharge of the electrochemical cell so as to allow a reversible change in volume of the negative electrode greater than or equal to 200% without mechanical failure. In an embodiment, for example, the carbon nanotubes of the second assembly provide a mechanical scaffold capable of accommodating stress resulting from expansion of the sulfur active material during charging or discharge of the electrochemical cell so as to allow a reversible change in volume of the positive electrode greater than or equal to 200% without mechanical failure. This aspect of the invention is particularly useful for providing good cycle life for composite negative electrodes having a silicon active material, for example, by avoiding fracture, cracking and disconnection from the current collector during charge-discharge cycling.

In an embodiment, for example, the carbon nanotubes of the first and second assemblies provide an effective means of increasing the overall electrical conductivity of the positive and/or negative electrodes. In an embodiment, for example, the carbon nanotubes of the first assembly and the carbon nanotubes of the second assembly independently increase the overall conductivity of the positive electrode and the negative electrode by a factor greater than or equal to 10 and optionally for some embodiments, greater than or equal to 100. For example, carbon nanotubes are typically more than 5 and 19 orders of magnitude more electrically conductive than silicon and sulfur, respectively. For geometries wherein carbon nanotubes are 0.1 vol % of the bulk electrode, an improvement in conductivity of about 100 times is achievable using the nanocomposite electrode structures of the invention. This aspect of the invention is particularly useful for providing useful conductivities for composite positive electrodes having a sulfur active material high resistance.

The electrochemical cells of the invention are compatible with a range of active materials for positive and negative electrodes including high performance, stable and nontoxic materials. In an embodiment, for example, the silicon active material comprises a silicon-containing material, such as elemental silicon or an alloy thereof. In an embodiment, for example the sulfur active material comprises a sulfur-containing material, such as elemental sulfur. Significant advantages of embodiments of the invention including silicon and sulfur active materials include high specific capacity, low cost, and avoidance of toxic materials such a conventional transition metal-metal cathode materials.

In an embodiment, for example, the silicon active material and the sulfur active material independently comprises a single crystalline material, a polycrystalline material or amorphous material. In an embodiment, for example, the silicon active material and sulfur active material are provided in electrical contact, and optionally physical contact, with the carbon nanotubes of the first and second assemblies. In an embodiment, for example, the silicon active material is provided on the carbon nanotubes of the first assembly and/or the sulfur active material is provided on the carbon nanotubes of the second assembly independently by a process selected from the group consisting physical vapor deposition, chemical vapor deposition, electrodeposition, sputtering, solution casting, liquid infusion and liquid deposition. In an embodiment, for example, the silicon active material at least partially coats, and optionally fully coats, the carbon nanotubes of the first assembly, the sulfur active material at least partially coats the carbon nanotubes of the second assembly or wherein both the silicon active material at least partially coats, and optionally fully coats, the carbon nanotubes of the first assembly and the sulfur active material at least partially coats, and optionally fully coats, the carbon nanotubes of the second assembly. In an embodiment, for example, the silicon active material provides a coating on at least a portion of the carbon nanotubes of the first assembly having a thickness greater than or equal to 0.1 μm. In an embodiment, for example, the sulfur active material provides a coating on at least a portion of the carbon nanotubes of the first assembly having a thickness greater than or equal to 0.1 μm. In an embodiment, for example, positive and negative electrodes independently have overall thicknesses (i.e., active material+carbon nanotubes) selected from the range of 10 μm to 1 mm, optionally for some applications selected from the range of 100 μm to 1 mm.

Electrochemical cells of the invention may further comprise one or more graphene enclosures at least partially enclosing the active materials for positive and/or negative electrodes so as to provide overall enhanced mechanical, chemical and/or electronic properties of positive and/or negative electrodes. Graphene layers of these embodiments may function as chemical barriers and/or mechanical supports for the positive and/or negative electrodes. In an embodiment, for example, the electrochemical cell further comprises a first graphene layer at least partially enclosing the silicon active material of the negative electrode, a second graphene layer at least partially enclosing the sulfur active material of the positive electrode or both a first graphene layer at least partially enclosing the silicon active material of the negative electrode and a second graphene layer at least partially enclosing the sulfur active material of the positive electrode. In an embodiment, for example, the graphene layer(s), such as the first graphene layer and the second graphene layer, are each permeable to the charge carriers, such as $Li^+$ ion charge carriers, for example, by providing ion transport of charge carriers via defects or other passage structures in the graphene layer(s). In an embodiment, for example, the graphene layer(s), such as the first graphene layer and the second graphene layer, each independently have an average thickness selected over the range of 5 nm to 100 nm. In an embodiment, the first graphene layer is provided in physical contact with said silicon active material or a layer provided thereon, and the second graphene layer is provided in physical contact with the sulfur active material or a layer provided thereon. In an embodiment, for example, the first graphene layer and/or the second graphene layer provide an elastic barrier with the electrolyte capable of accommodating expansion or contraction of the volume of the silicon active material of the negative electrode and/or the sulfur active material of the positive electrode, for example, occurring upon charge and discharge cycling. In an embodiment, for example, the first graphene layer or the second graphene layer independently provide a chemical barrier capable of prevent transport of one or more reaction products from the silicon active materials of the negative electrode or the sulfur active material of the positive electrode and the electrolyte. In an embodiment, for example, the second graphene layer prevents transport of polysulfides generated at the sulfur active material of the positive electrode to the electrolyte.

Electrochemical cells of the invention are compatible with a wide range of electrolytes, including liquid phase electrolytes, gel electrolytes or a solid phase electrolytes. In an embodiment, for example, the electrolyte comprises a nonaqueous solvent and a lithium-containing salt at least partially dissolved in the nonaqueous solvent. Electrolytes of the invention may be provided between said electrodes such that charge charges can be transported from the electrolyte to the electrode surface, such as provided in physical contact with the electrode surface or a layer on the electrode surface (e.g., SEI layer). In an embodiment, for example, the electrolyte has an ionic conductivity for the charge carriers, such as $Li^+$ charge carriers, greater than or equal to 1.5 S cm$^{-1}$, and optionally greater than or equal to 5 S cm$^{-1}$. Useful lithium salts for this aspect of the present invention include, but are not limited to, $LiBF_4$, $LiF$, $LiClO_4$, $LiAsF_6$, $LiSbF_6$ and $LiPF_6$. Solvents useful in nonaqueous electrolytes of the present invention include, but are not limited to, propylene carbonate, 1,2-dimethoxy ethane, trifluoroethyl ether, diethyl ether, diethoxyethane, 1-3 dioxolane, tetrahydrofuran, 2-methyl tetrahydrofuran, ethylene carbonate, dimethyl carbonate, diethyl carbonate, ethyl methyl carbonate, methyl formate, α-butyrolactone, dimethyl carbonate, diethyl carbonate, methyl ethyl carbonate, gamma-butyrolactone, diethoxyethane, acetonitrile, and methylacetate. In an embodiment, for example, the electrolyte comprises $LiBF_4$ at least partially dissolved in propylene carbonate or $LiPF_6$ at least partially dissolved in ethylene carbonate.

The electrochemical systems of the present invention include secondary electrochemical cells and supercapacitors exhibiting good electronic performance. In an embodiment, for example, an electrochemical system of the invention comprises a lithium ion battery, such as a silicon—sulfur lithium ion battery. In an embodiment, for example, the invention provides an electrochemical cell having a specific energy greater than or equal to about 387.5 Wh kg$^{-1}$; e.g., ¼ of the theoretical specific energy. In an embodiment, for example, the invention provides an electrochemical cell having a standard cell voltage equal to or greater than 1.35 V; e.g., 80% voltage efficiency. In an embodiment, for example, the invention provides an electrochemical cell having a cycle life equal to or greater than about 1000 cycles.

In another aspect, the invention provides a method of generating an electrical current, the method comprising the steps of: (i) providing an electrochemical cell; the electrochemical comprising: (1) a negative electrode comprising a first assembly of carbon nanotubes supporting a silicon active material; (2) a positive electrode comprising a second assembly of carbon nanotubes supporting a sulfur active material; and (3) an electrolyte provided between the positive electrode and the negative electrode; the electrolyte capable of conducting, charge carriers; wherein the first assembly of carbon nanotubes and the second assembly of carbon nanotubes are physically separated from each other and are supported by a common surface; and (ii) discharging the electrochemical cell. In an embodiment, the method of this aspect further comprises any of the additional process steps and/or process conditions as described herein.

In another aspect, the invention provides a method of making an electrochemical cell comprising the steps of: (i) providing a first assembly of carbon nanotubes; (ii) incorporating a silicon active material into the first assembly of carbon nanotubes, thereby generating a negative electrode comprising the silicon active material supported by the first assembly of carbon nanotubes; (iii) providing a second assembly of carbon nanotubes; (iv) incorporating a sulfur active material into the second assembly of carbon nanotubes, thereby generating a positive electrode comprising the sulfur active material supported by the second assembly of carbon nanotubes; (v) providing a substrate having an external surface; (vi) providing the negative electrode to a first region supported by the external surface; (vii) providing the positive electrode to a second region supported by the external surface; wherein the first assembly of carbon nanotubes of the negative electrode and the second assembly of carbon nanotubes of the positive electrode are physically separated from each other and are supported by the external surface; and (viii) providing an electrolyte between the positive electrode and the negative electrode; the electrolyte capable of conducting charge carriers. In an embodiment, the method of this aspect does not include a step of providing a separator (e.g., a permeable membrane) between the negative electrode and positive electrode. In an embodiment, the method of this aspect further comprises any of the additional process steps and/or process conditions as described herein.

In an embodiment, for example, the step of providing the first assembly of carbon nanotubes comprises growing the first assembly of carbon nanotubes directly on the external surface of the substrate or a structure provided thereon. In an embodiment, for example, the step of providing the first assembly of carbon nanotubes comprises growing the first assembly of carbon nanotubes on a first current collector or on a first electrical interconnect supported by the first current collector and wherein the step of providing the second assembly of carbon nanotubes comprises growing the second assembly of carbon nanotubes on a second current collector or on a second electrical interconnect supported by the second current collector. Useful methods for growing the first and second assembly of nanotubes include patterning a current collector or electrical interconnect with a carbon nanotube growth catalyst and exposing the patterned nanotube growth catalyst to a gas phase or liquid phase carbon nanotube precursor. Patterning of carbon nanotube growth catalyst in these embodiments provides an effective means of controlling the physical dimensions, physical properties (e.g., surface concentration and/or density of nanotubes, etc.) and position of the carbon nanotube arrays. In an embodiment, for example, arrays of vertically aligned carbon nanotubes are independently grown on the substrate, the first or second current collectors or electrical interconnects, for example, via techniques known in the art [see, e.g., Aria, A. I. & Gharib, M. Reversible Tuning of the Wettability of Carbon Nanotube Arrays: The Effect of Ultraviolet/Ozone and Vacuum Pyrolysis Treatments. Langmuir 27, 9005-9011, doi:10.1021/la201841m (2011)]. In an embodiment, for example, first and second carbon nanotube assemblies are grown directly on the first and second current collectors, respectively, optionally in a configuration supported by the external surface of the substrate.

In an embodiment, for example, the step of incorporating the silicon active material into the first assembly of carbon nanotubes and incorporating the sulfur active material into the second assembly of carbon nanotubes are independently carried out using a method selected from the group consisting of physical vapor deposition, chemical vapor deposition, sputtering, electrodeposition, solution casting, liquid infusion and liquid deposition. Incorporating silicon into the first assembly of carbon nanotubes, for example, can be carried out via chemical vapor deposition using a silane precursor, dispersion of silicon nanoparticles and/or nanowires, and/or physical vapor deposition of Si using sputtering and/or evaporation techniques. Incorporating sulfur into the second assembly of carbon nanotubes, for example, can be carried out via infusion of molten sulfur and/or sulfur containing solution into the intertube spacing of the carbon nanotube assembly. In embodiment, for example, incorporation of sulfur into the second assembly of carbon nanotubes results in a change in mass selected over the range of 300% to 350%.

Methods of this aspect of the invention may further comprise prelithiating the silicon active material supported by the first assembly of carbon nanotubes and/or prelithiating the sulfur active material supported by the second assembly of carbon nanotubes. In some embodiments, for example, the silicon active material supported by the first nanotube array is placed in physical contact with metallic lithium, such as a lithium foil or stabilized lithium metal powder, to provide for spontaneous prelithiation. Alternatively, prelithiation can be carried out electrochemically, for example, by connecting the silicon active material supported by the first nanotube array to the negative side of a DC power supply while a lithium metal foil is connected to the positive side. In an embodiment, the silicon active material supported by the first nanotube array is prelithiated such that it undergoes a change in volume selected over the range of 250% to 300%.

In an embodiment, for example, the method of this aspect further comprises at least partially enclosing, and optionally fully enclosing, the silicon active material supported by the first assembly of carbon nanotubes with a first graphene layer and/or at least partially enclosing, and optionally fully enclosing, the sulfur active material supported by the second assembly of carbon nanotubes with a second graphene layer. Fabrication approaches for achieving graphene enclosures useful in the present methods include drop-casting and drying a dispersion of graphene films directly onto the active material supported by the nanotube assembly.

In an embodiment, for example, the method of this aspect further comprises providing the negative electrode and the positive electrode on a common surface comprising the external surface of the substrate or an intermediate structure provide thereon (e.g., a current collector, electrical interconnect, etc.). Device fabrication in some methods is achieved by providing the first and second current collectors supporting first and second carbon nanotube assemblies, respectively, onto an external surface of the substrate or an intermediate structure provided therein (e.g., a current collector, electrical interconnect, etc.). In an embodiment, for example, the first and second carbon nanotube assemblies are provided on a common surface in a configuration without touching each other. Methods of this aspect of the invention may further comprise providing the positive and negative electrodes supported by the substrate in a casing.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1A:
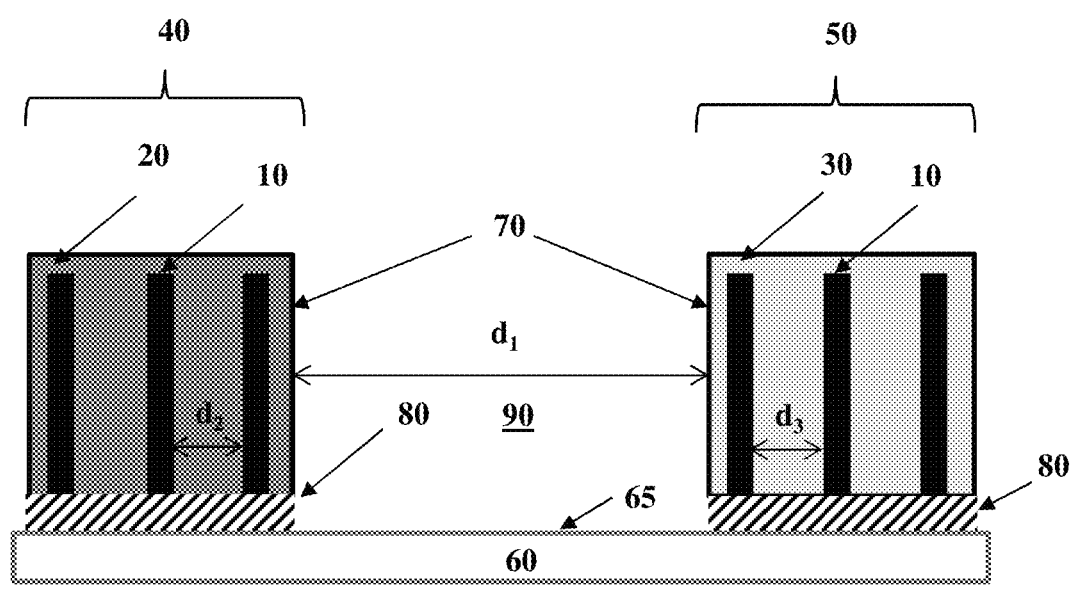
FIG. 1A: Schematic cross-sectional view of an electrochemical cell.

In general, the terms and phrases used herein have their art-recognized meaning, which can be found by reference to standard texts, journal references and contexts known to those skilled in the art. The following definitions are provided to clarify their specific use in the context of the invention.

"Standard electrode potential" (E°) refers to the electrode potential when concentrations of solutes are 1 M, the gas pressures are 1 atm and the temperature is 25 degrees Celsius. As used herein standard electrode potentials are measured relative to a standard hydrogen electrode.

"Charge carrier" refers to an ion provided in an electrochemical cell that migrates between positive and negative electrodes during discharge and charging of the electrochemical cell. Charge carriers may be present in an electrolyte and/or electrode components of the electrochemical cell. Charge carriers useful in electrochemical cells of the present invention include lithium ion (Li+).

"Active material" refers to material in an electrode that takes part in the electrochemical reactions which store or delivery electrical energy. In some embodiments, active materials for positive electrode and/or negative electrode independently comprise a host material, such as a $Li^+$ host material. Active materials useful for positive electrodes of the invention include sulfur, for example, elemental sulfur. Active materials useful for negative electrodes of the invention include silicon and alloys thereof.

"Host material" refers to a material capable of accommodating lithium ions. In this context, accommodating includes insertion of lithium ions into the host material, intercalation of lithium ions into the host material and/or reaction of lithium ions with the host material.

"Intercalation" refers to refers to the process wherein an ion inserts into a host material to generate an intercalation compound via a host/guest solid state redox reaction involving electrochemical charge transfer processes coupled with insertion of mobile guest ions, such as lithium ions. Major structural features of the host material are preserved after insertion of the guest ions via intercalation. In some host materials, intercalation refers to a process wherein guest ions are taken up with interlayer gaps (e.g., galleries) of a layered host material.

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. General cell and/or battery construction is known in the art, see e.g., U.S. Pat. Nos. 6,489,055, 4,052,539, 6,306,540, Seel and Dahn J. Electrochem. Soc. 147(3) 892-898 (2000).

"Electrode" refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species.

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours $kg^{-1}$.

The term "discharge rate" refers to the current at which an electrochemical cell is discharged. Discharge rate can be expressed in units of ampere. Alternatively, discharge rate can be normalized to the rated capacity of the electrochemical cell, and expressed as C/(X t), wherein C is the capacity of the electrochemical cell, X is a variable and t is a specified unit of time, as used herein, equal to 1 hour.

"Current density" refers to the current flowing per unit electrode area.

"Electrode potential" refers to a voltage, usually measured against a reference electrode, due to the presence within or in contact with the electrode of chemical species at different oxidation (valence) states.

"Electrolyte" refers to an ionic conductor which can be in the solid state, the liquid state (most common) or more rarely a gas (e.g., plasma). Electrochemical cells of some embodiments comprise a lithium-containing salt at least partially dissolved in a non-aqueous solvent.

"Carbon nanotube" and "nanotube" are used synonymously and refer to allotropes of carbon comprising one or more cylindrically configured graphene sheets. Carbon nanotubes include single walled carbon nanotubes (SWNTs) and multiwalled carbon nanotubes (MWNTs). Carbon nanotubes typically have small diameters ($\approx$1-100 nanometers) and large lengths (up to several millimeters (e.g., 5 mm)), and therefore may exhibit length to diameter ratios$\approx 10^2$ to about $10^8$. The longitudinal dimension of a nanotube is its length and the cross sectional dimension of a nanotube is its diameter (or radius). Carbon nanotubes include semiconducting carbon nanotubes, metallic carbon nanotubes, semi-metallic carbon nanotubes and mixtures of these.

"Vertically aligned nanotubes" refer to nanotubes that are provided in an orientation wherein their lengths extend away from a common surface optionally in substantially the same direction. In some embodiments, vertically aligned nanotubes are provided in an orientation wherein their lengths extend away from a common surface that is one or more external surface(s) of a substrate or structure provide on a substrate, such as a current collector, electrical interconnect, other device component, etc. In some embodiments, vertically aligned nanotubes are provided in an array geometry wherein adjacent nanotubes in the array are substantially aligned with each other. In some embodiments, vertically aligned nanotubes have lengths extending in vertical directions (i.e., away from the common surface) that are parallel. In some embodiments, for example, vertically aligned nanotubes have a linear geometry wherein their lengths assume a substantially straight configuration (i.e. with deviations from linearity equal to or less than about 20%). As used in this context, the term "parallel" refers to a geometry in which the lengths of carbon nanotubes are substantially equidistant from each other for at least a portion of the points along their respective lengths and have the same direction or curvature. The term parallel is intended to encompass some deviation from absolute parallelism. In one embodiment, for example longitudinally aligned nanotubes have parallel spatial orientations relative to each other with deviations from absolute parallelism that are less than 20 degrees, preferably for some applications deviations from absolute parallelism that are less than 10 degrees, and more preferably for some applications deviations from absolute parallelism that are less than 1 degrees. "Substantially aligned nanotubes" have lengths extending in vertical directions that are aligned with respect to each other but not provided in an absolutely parallel configuration. In some embodiments, for example, substantially aligned nanotubes have a partially linear geometry wherein their lengths assume a configuration with deviations from absolute linearity greater than about 10%, and in some embodiments with deviations from absolute linearity greater than about 20%.

"Assembly of carbon nanotubes" refers to group of carbon nanotubes that are spatially localized, for example, spatially localized on a region of one or more external surface(s) of a substrate or a structure provide on a substrate, such as a current collector, electrical interconnect, other device component, etc. Assemblies of carbon nanotubes include nanotube arrays, including arrays of substantially aligned nanotubes, nanotubes exhibiting a high degree of linearity, and vertically aligned nanotubes. Assemblies of carbon nanotubes include nanotube networks, including networks comprising nanotubes provided in random or substantially aligned orientations, and networks characterized by a plurality of nanotube crossings.

The expression "degree of linearity" refers to a characteristic of a carbon nanotube that reflects deviations in the center positions of the tube along its length as compared to a perfectly straight line that best approximates the shape of the nanotube. Carbon nanotubes exhibiting a high degree of linearity have a conformation that approximates a perfectly straight line. The expression high degree of linearity is intended to include, however, nanotube conformations having some deviations from a perfectly straight line that best approximates the shape of the nanotube. In some embodiments, nanotubes exhibiting a high degree of linearity have deviations from perfect linearity along their entire lengths that are less than or equal to about 50 nanometers, and in embodiments useful for some applications have deviations from perfect linearity along their entire lengths that are less than or equal to about 10 nanometers. In some embodiments, nanotubes exhibiting a high degree of linearity have deviations from perfect linearity that are less than or equal to about 50 nanometers per micron of length, and in embodiments useful for some applications have deviations from perfect linearity that are less than or equal to about 5 nanometers per micron of length. The present invention provides nanotube arrays and related methods of making nanotube arrays wherein at least 95% of the nanotubes in the array exhibit a high degree of linearity.

"Array of nanotubes" refers to a plurality of nanotubes having a spatial configuration wherein individual nanotubes in the array have selected relative positions and relative spatially orientations.

"Nanotube precursors" refers to materials that are used to generate carbon nanotubes, for example by chemical vapor deposition processes, electrochemical synthesis process and pyrolytic processes. In some embodiments, nanotube precursors interact with carbon nanotube growth catalyst to generate carbon nanotubes. Exemplary nanotube precursors include hydrocarbons such as methane, carbon monoxide, ethylene, benzene, and ethyl alcohol.

"Nanotube growth catalysts" are materials that catalyze the formation and growth of carbon nanotubes. Useful nanotube growth catalysts for the methods of the present invention include, but are not limited to, ferritin, nickel, molybdenum, palladium, yttrium, iron, copper, molybdenum, cobalt.

"Supported by a substrate" refers to a structure that is present at least partially on a substrate surface or present at least partially on one or more intermediate structures positioned between the structure and the substrate surface. The term "supported by a substrate" may also refer to structures partially or fully embedded in a substrate, structures partially or fully immobilized on a substrate surface and structures partially or fully laminated on a substrate surface.

The term "nanostructured" refers materials and/or structures have a plurality of discrete structural domains with at least one physical dimension (e.g., height, width, length, cross sectional dimension) that is less than about 1 micron. In this context, structural domains refer to features, components or portions of a material or structure having a characteristic composition, morphology and/or phase. "Supported by a substrate" refers to a structure that is present at least partially on a substrate surface or present at least partially on one or more intermediate structures positioned between the structure and the substrate surface.

Figure 1B:
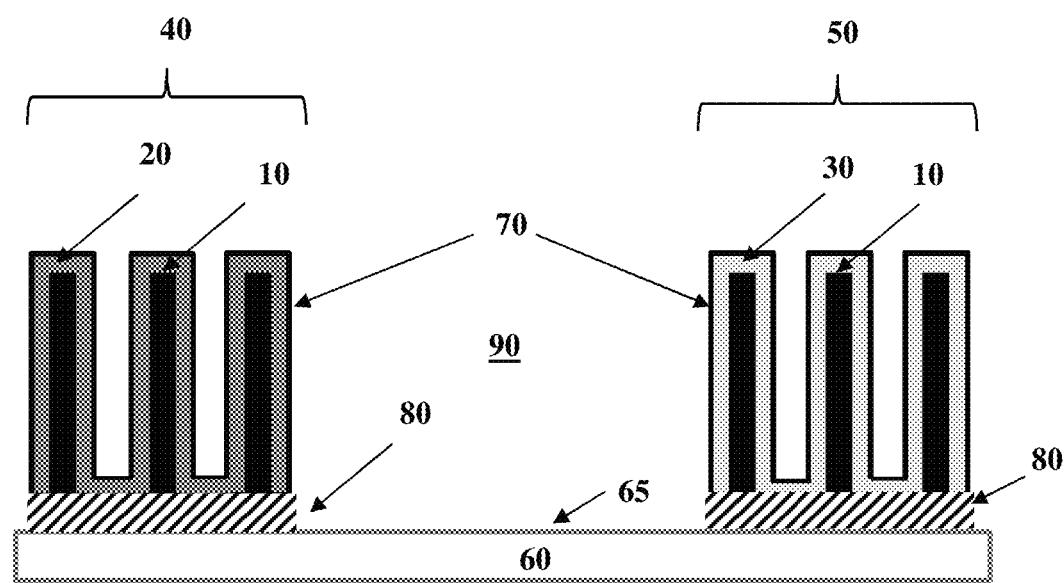
FIG. 1B: Schematic cross-sectional view of another electrochemical cell.

FIGS. 1A and 1B schematically illustrate electrochemical cells of the present invention. The cells illustrated in FIGS. 1A and 1B are shown in cross-section. Each of the electrochemical cells in FIGS. 1A and 1B comprises a negative electrode (40) and a positive electrode (50) provided on a common surface (65) and supported by substrate (60). Negative electrode (40) and a positive electrode (50) are separated by electrolyte (90) capable of conducting charge carriers, such as lithium ion (Li$^+$) charge carriers. Negative electrode (40) and a positive electrode (50) independently comprise an assembly of nanotubes supporting an active material. In some embodiments, for example, negative electrode (40) comprises a first assembly of nanotubes (10) supporting a silicon active material (20) and positive electrode (50) comprises a second assembly of nanotubes (10) supporting a sulfur active material (30). FIGS. 1A and 1B also show optional components of negative electrode (40) and a positive electrode (50), including current collector (80) supported by substrate (60) and graphene enclosure (70) at least partially enclosing, and optionally in physical contact with, the active material supported by the carbon nanotube assemblies. Optionally, a graphene interconnection (not shown in FIGS. 1A and 1B but shown in FIG. 2B) is independently provided between the assembly of nanotubes (10) and current collector (80) of either, or both of, positive or negative electrodes.

As shown in FIGS. 1A and 1B, the negative and positive electrodes are (40) and (50) separated by distance $d_1$ defining a space occupied by electrolyte (90). In some embodiments, $d_1$ is greater than or equal to 10 µm, and optionally for some embodiments $d_1$ is greater than or equal to 100 µm. This arrangement allows ions to be effectively transported between positive electrode (50) and negative electrode (40) during charge and discharge of the electrochemical cell but ensures that positive electrode (50) and negative electrode (40) are not in electrical contact. Both electrodes (40) and (50) are maintained in a spatially localized position supported by common substrate (60), for example, through their connection (e.g., bonding) to the substrate (60) or a structure supported by the substrate such as current collector (80) or an electrical interconnect provided on current collector (80). The electrode arrangement in FIGS. 1A and 1B, therefore, does not include, or require, a conventional separator (e.g. ion conducting permeable membrane) to separate the positive and negative electrodes in the cell designs illustrated in FIGS. 1A and 1B. Rather, separation of the negative (40) and positive electrodes and (50) is effectively achieved via spatially localizing their respective carbon nanotube assemblies, for example, via patterning of the nanotubes on the substrate or a structure supported by the substrate.

As shown in FIGS. 1A and 1B, each electrode comprises an assembly of carbon nanotubes (10). As used in description of this embodiment, an assembly of nanotubes refers to a plurality of nanotubes provided in a spatially localized region supported by substrate (60). As shown FIGS. 1A and 1B, the individual nanotubes (10) are separated by an, average distance d2 in the negative electrode and a distance d3 in the positive electrode. In an embodiment, the average spacing between adjacent nanotubes is 2-4 times the average diameter of the nanotubes. In an embodiment, the average spacing between adjacent nanotubes is selected over the range of 10 nm to 200 nm.

FIGS. 1A and 1B show the carbon nanotubes as being generally vertically aligned. In the embodiment shown in FIGS. 1A and 1B, vertically aligned carbon nanotubes are provided in an orientation that is substantially perpendicular to the surface on which they are supported or attached. Nanotubes are said to be substantially perpendicular when they are oriented on average within 30, 25, 20, 15, 10, or 5 degrees of the surface normal. In other embodiments the carbon nanotubes are not vertically aligned. In an embodiment, non-aligned carbon nanotubes may take the form of a network, mat or forest of carbon nanotubes grown from the catalyst material. In an embodiment, the nanotubes are multiwalled nanotubes. In an embodiment, the average diameter of the multiwalled nanotubes is from 15 nm to 400 nm, from 15 nm to 200 nm, from 15 nm to 100 nm or from 15 nm to 50 nm, In an embodiment, the nanotubes are grown from a catalyst material, for example provided on a current collector (80) or an electrical interconnect supported by the substrate (60). In some embodiments, the current collector (80) is a metal current collector, carbon current collector (e.g., graphite) or particulate current collector. In an embodiment, the nanotubes are bonded to the common surface, to the catalyst material, or a combination thereof. Suitable catalyst materials include, but are not limited to Fe, Co, Ni, Au, Ag, Cu, Pb and In.

The assembly of nanotubes in each electrode supports an active material. In an embodiment the active material fills in the spaces between the nanotubes, as shown in FIG. 1A. In other embodiments the active material does not completely fill the space between the carbon nanotubes, but rather at least partially coats individual nanotubes as shown in FIG. 1B. A variety of techniques can be used for providing the active material onto the nanotubes of the assembly including physical vapor deposition, chemical vapor deposition, electrodeposition, sputtering, solution casting, liquid infusion and liquid deposition. In an embodiment, negative electrode (40) comprises a silicon active material (20) and positive electrode (50) comprises support for a sulfur active material (30). Use of a carbon nanotube array to support the active material increases the overall conductivity of the electrode, thereby providing enhanced discharge rate capability. In an embodiment, use of a carbon nanotube array to support the active material reduces the residual stress due to volume change of the active material during cycling of the electrochemical cell, thereby enhancing cycling performance of the electrochemical cell.

In an aspect of the invention, a graphene layer (70) is connected to and at least partially encloses the active material of an electrode. As shown in FIG. 1A, a graphene layer is connected to and at least partially encloses the sulfur active material, while another graphene layer is connected to and at least partially encloses the silicon active material. In an embodiment, the graphene layer allows efficient transport of lithium ions through the layer but limits, or prevents transport, of certain reaction products (e.g. polysulfides) from electrode to electrolyte, for example, reaction products that can negatively impact electrochemical performance. The relative ease of movement of various species through the graphene layer can be controlled at least in part through control of the defect density in the graphene layer. Limiting the extent of electrode degradation can also limit degradation of the electrolyte and/or the interface (e.g. the SEI layer) between the electrolyte and the electrode.

An electrolyte (90) is present between the negative and positive electrodes. In an embodiment, the electrolyte is a liquid having high ionic conductivity and low electrical conductivity. In an embodiment, the electrolyte is a nonaqueous electrolyte comprising a solution of a lithium salt and a solvent. Useful lithium salts for this aspect of the present invention include, but are not limited to, $LiBF_4$, LiF, $LiClO_4$, $LiAsF_6$, $LiSbF_6$ and $LiPF_6$. In an embodiment, for example, the lithium salt, such as $LiBF_4$, has a concentration in the nonaqueous electrolyte solution that is preferably less than 1.0 M for some applications, and more preferably less than 0.5 M for some applications. Useful lithium salt concentrations for some electrochemical cells of the present invention are selected from the range of about 0.75 M to about 0.25 M, for example when LiBF4 is the selected lithium salt. Solvents useful in nonaqueous electrolytes of the present invention include, but are not limited to, propylene carbonate, 1,2-dimethoxy ethane, trifluoroethyl ether, diethyl ether, diethoxyethane, 1-3 dioxolane, tetrahydrofuran, 2-methyl tetrahydrofuran, ethylene carbonate, dimethyl carbonate, diethyl carbonate, ethyl methyl carbonate, methyl formate, α-butyrolactone, dimethyl carbonate, diethyl carbonate, methyl ethyl carbonate, gamma-butyrolactone, diethoxyethane, acetonitrile, and methylacetate. Nonaqueous electrolytes of the present invention also include fluorine analogs of the solvents An enclosure (100) is typically included in the cell but is not is not shown in FIGS. 1A and 1B to facilitate identification of various cell features. Enclosure (100) is shown, however, in FIGS. 1C-1F and FIG. 2, as described below.

Figure 1C:
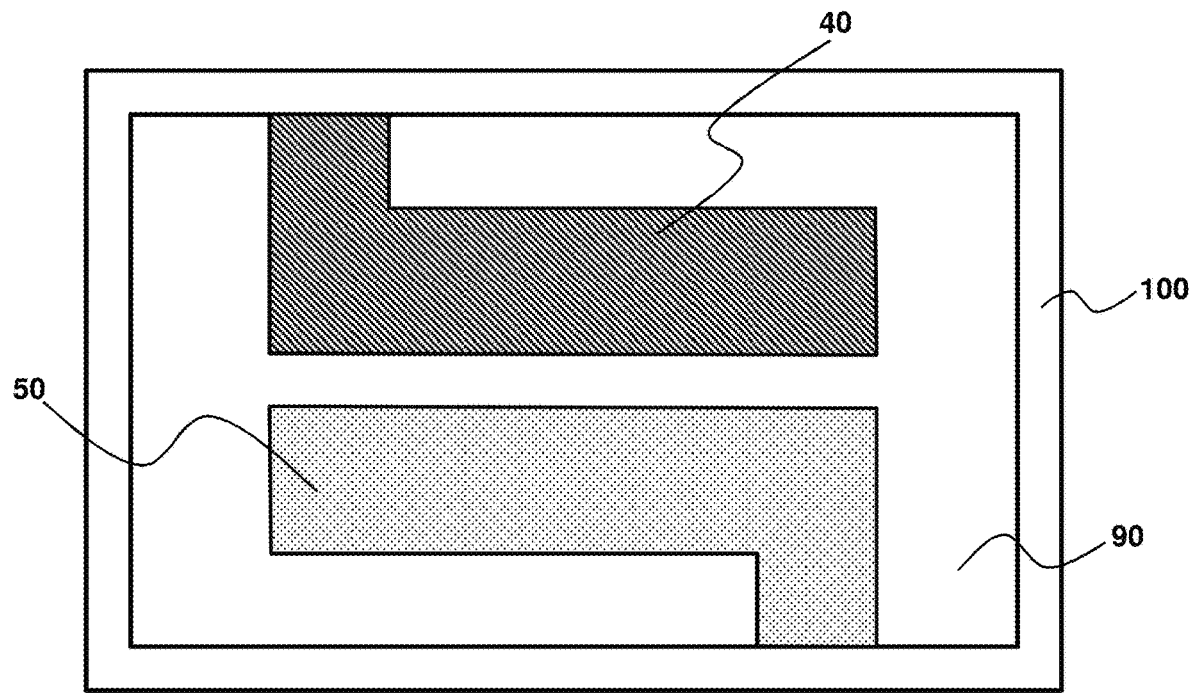
FIG. 1C: Schematic top view of an electrochemical cell in which the electrodes form two adjacent strips.
Figure 1D:
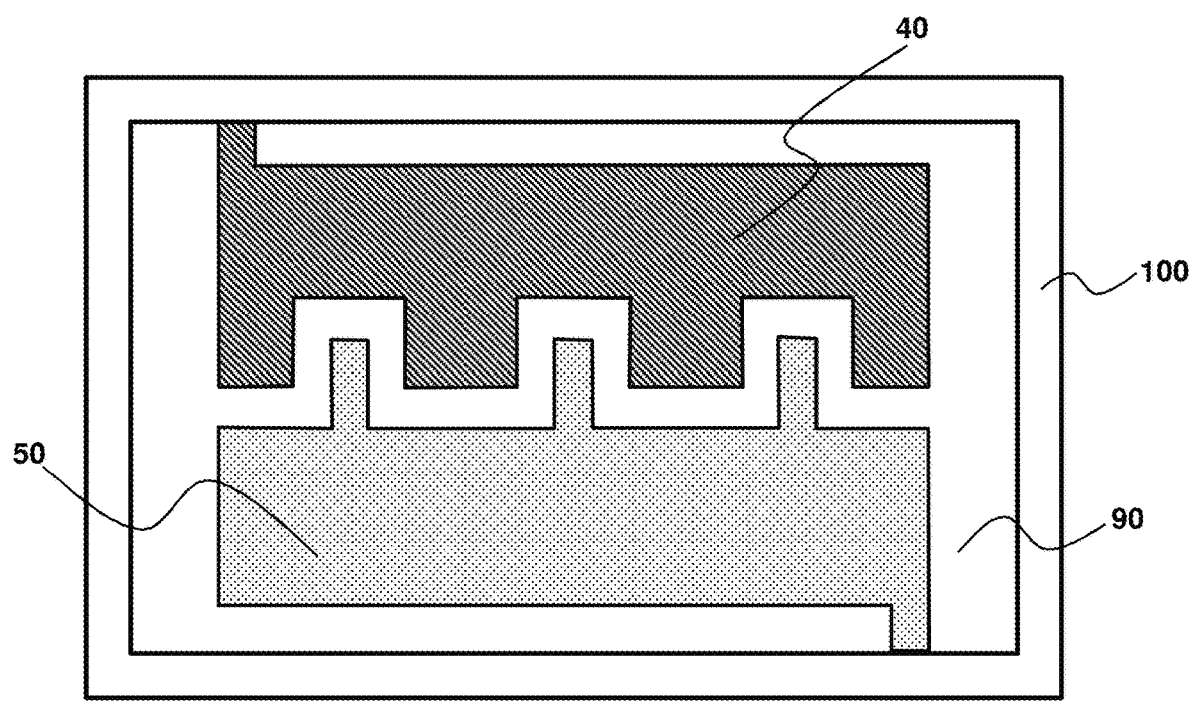
FIG. 1D: Schematic top view of an electrochemical cell with interleaved electrodes.
Figure 1E:
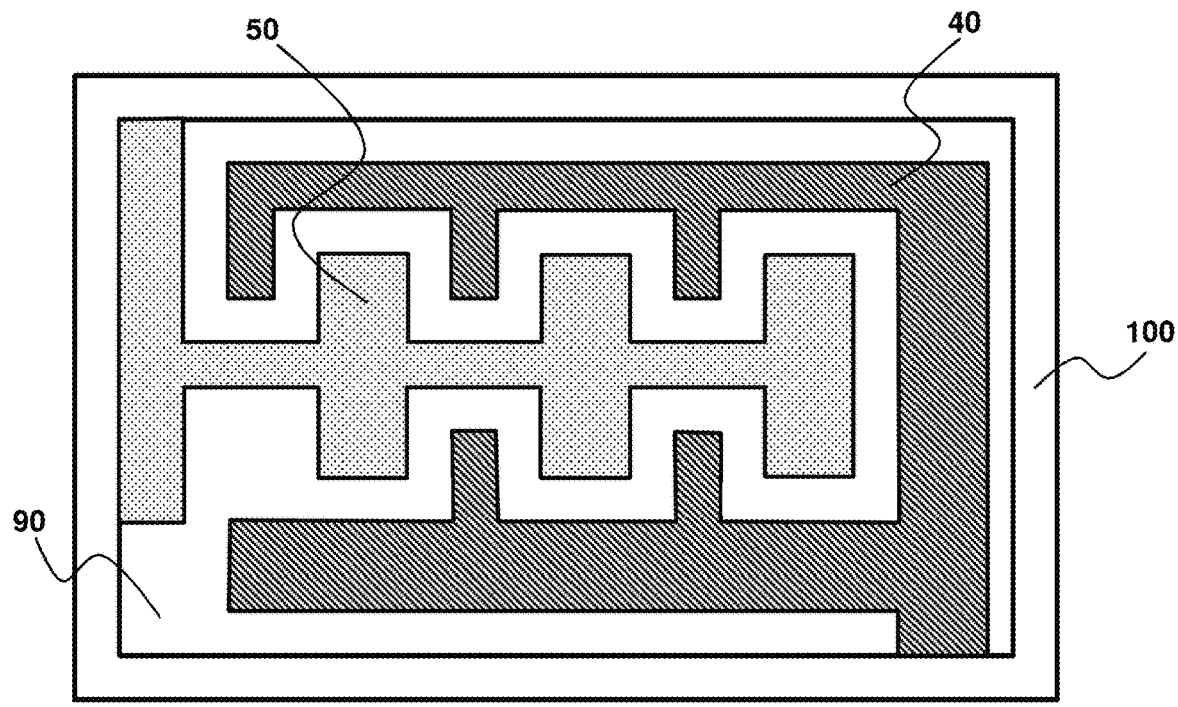
FIG. 1E: Schematic top view of another electrochemical cell with interleaved electrodes; the negative electrode is generally c-shaped.
Figure 1F:
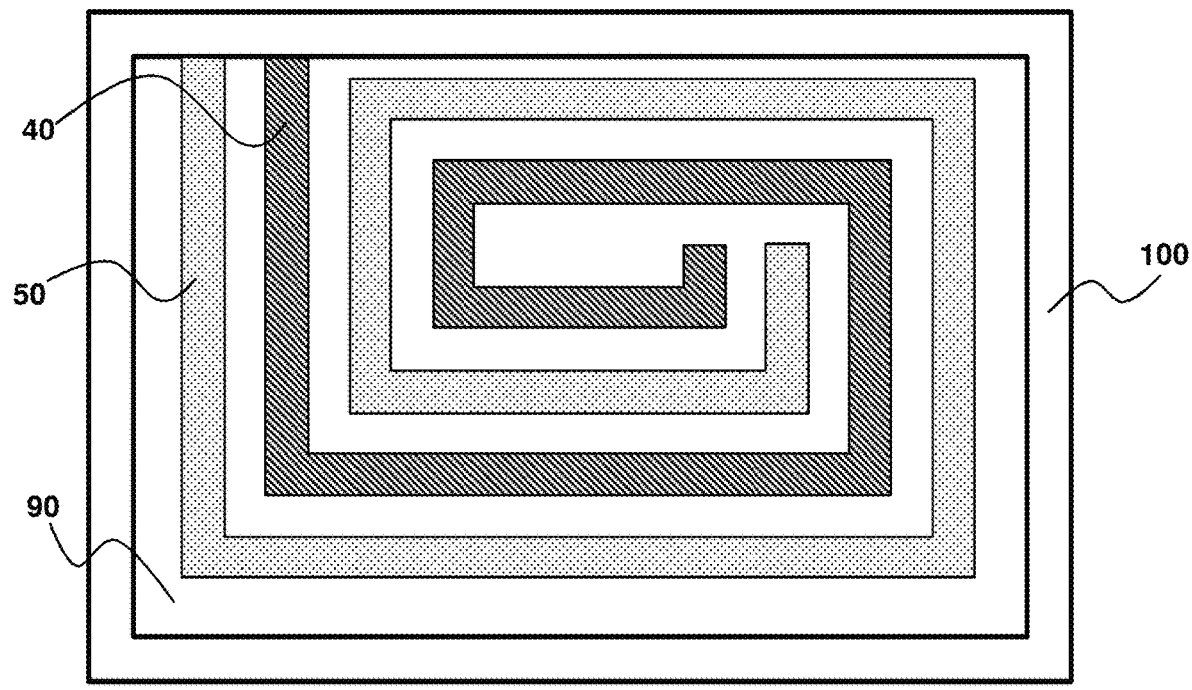
FIG. 1F: Schematic top view of another electrochemical cell in which each electrode is generally in the form of a rectangular spiral.

FIGS. 1C-F illustrate top views of different electrode configurations of electrochemical cells of the invention. In an embodiment, both electrodes are similarly shaped. FIG. 1C illustrates a configuration in which both electrodes are generally rectangular in shape. FIG. 1D the electrodes are interleaved; one electrode comprises recessed features while the other electrode comprises projecting features. FIG. 1F illustrates a configuration in which both electrodes are generally in the form of a rectangular spiral. FIG. 1E illustrates an embodiment in which one electrode is C-shaped while the other electrode is generally rectangular; the two electrodes are interleaved.

Example 1: Carbon Nanotubes—Graphene Hybrid Structures for Separator Free Silicon-Sulfur Batteries For decades, lithium ion batteries have been known as the most prominent means of storing electrical energy. However, a large-scale adoption of these batteries has been largely hindered by safety concerns, high production and maintenance cost, and mediocre performance. Such issues are mostly originated from the limited energy density and poor charge-discharge cycles associated with the currently available positive and negative electrodes (cathodes and anodes respectively). For example, the commonly used $LiMn_2O_4$ cathodes have a very low energy density and limited charge-discharge cycles. While $LiCoO_2$ and $LiFePO_4$ cathodes have a reasonably high energy density, the former are extremely toxic and the later have a very poor electrical conductivity. Similarly, the use of lithium metal anodes often leads to fire and explosion hazards. Dendrites grown on lithium metal during the charge-discharge cycles may cause a short circuit and thermal runaway. While the commonly used graphite anodes are very cheap and highly conductive, their energy density is extremely poor.

In order to mitigate the safety concern and improve the energy density of lithium ion batteries, the use of prelithiated silicon and sulfur as anode and cathode respectively has been envisioned.[1,2] Such a combination eliminates the need of using lithium metal and insertion-compound electrodes that are highly unstable and have a poor energy density. Because of its abundance and high theoretical capacity (4200 $mAhg^{-1}$), silicon has been considered the most promising anode material. However, the use of prelithiated silicon anode is not free from problems. Silicon undergoes a huge volume change during the charge-discharge cycle. Fractures, cracks, and disconnection from current collector due to such volume change lead to a rapid capacity fading and poor cycle life. Sulfur has also been considered the most promising cathode material because of its abundance, low cost, and high theoretical capacity (1675 $mAhg^{-1}$). In addition, sulfur is also more environmentally friendly compared to the toxic transition-metal compounds. Nevertheless, the use of a sulfur cathode is also not free from problems. Sulfur undergoes a series of structural and morphological changes during the charge-discharge cycle involving the formation of soluble lithium polysulfides $Li_2S_x$ and insoluble sulfides $Li_2S_2/Li_2S$ in liquid electrolyte. Such structural changes along with the high resistances of sulfur result in unstable electrochemical contact within sulfur electrodes. These issues lead to a rapid capacity fading, poor cycle life, low system efficiency, and large internal resistance.

It has been predicted that a lithium ion battery using a combination of silicon anode and sulfur cathode will have a specific energy of 1550 Wh/kg.[3] However, the actual battery performance may not be as impressive once the weight of other battery components, e.g. current collectors, electrolytes, separators, connectors, casing and packaging, has been taken into account. Typically, the actual specific energy of a battery is about a factor of 4 to 12 time smaller than the specific energy of just the active electrode materials.[4] Thus, in order to achieve an enhanced actual battery performance, the mass ratio (MR) and volume ratio (VR) between the active electrode materials and the other battery components has to be maximized.

In this Example, a novel scheme is described to fabricate high performance yet affordable lithium ion batteries using carbon nanotubes—graphene hybrid structures as the scaffolds and enclosures, and silicon and sulfur as the active electrode materials. These batteries will also be inherently safe due to the absence of toxic and unstable materials. This scheme includes four fundamental aspects:

1. Use of prelithiated silicon and sulfur as the active anode and cathode materials respectively.

2. Use of vertically aligned carbon nanotubes (VACNT) as the electrode scaffolds to accommodate a large volume change of silicon and sulfur during charge-discharge cycles. These VACNT scaffolds allow the use of very thick layers of silicon and sulfur while simultaneously reducing their internal electrical resistance.

3. Use of graphene as the electrode enclosures to prevent dissolution of polysulfides into the electrolytes as well as to minimize fracture of silicon and sulfur due to a volume change.

4. Cathode and anode, as well as their corresponding current collectors, are patterned so that both of them are placed on the same plane and the need for a separator can be eliminated.

In an embodiment, a patterned carbon nanotube scaffold comprising an assembly of carbon nanotubes is independently provided to support active materials for positive and negative electrodes, and an optionally a graphene enclosure partially encloses the active material. In an embodiment, patterning of the assemblies of carbon nanotubes spatially localizes positive and negative electrodes to separate regions supported by a substrate, thereby eliminating the need for a conventional separator component. Prelithiated active materials are used in some embodiments, thereby eliminating the need for metallic lithium to avoid problems associated with dendrite formation during cycling.

Figure 2A:
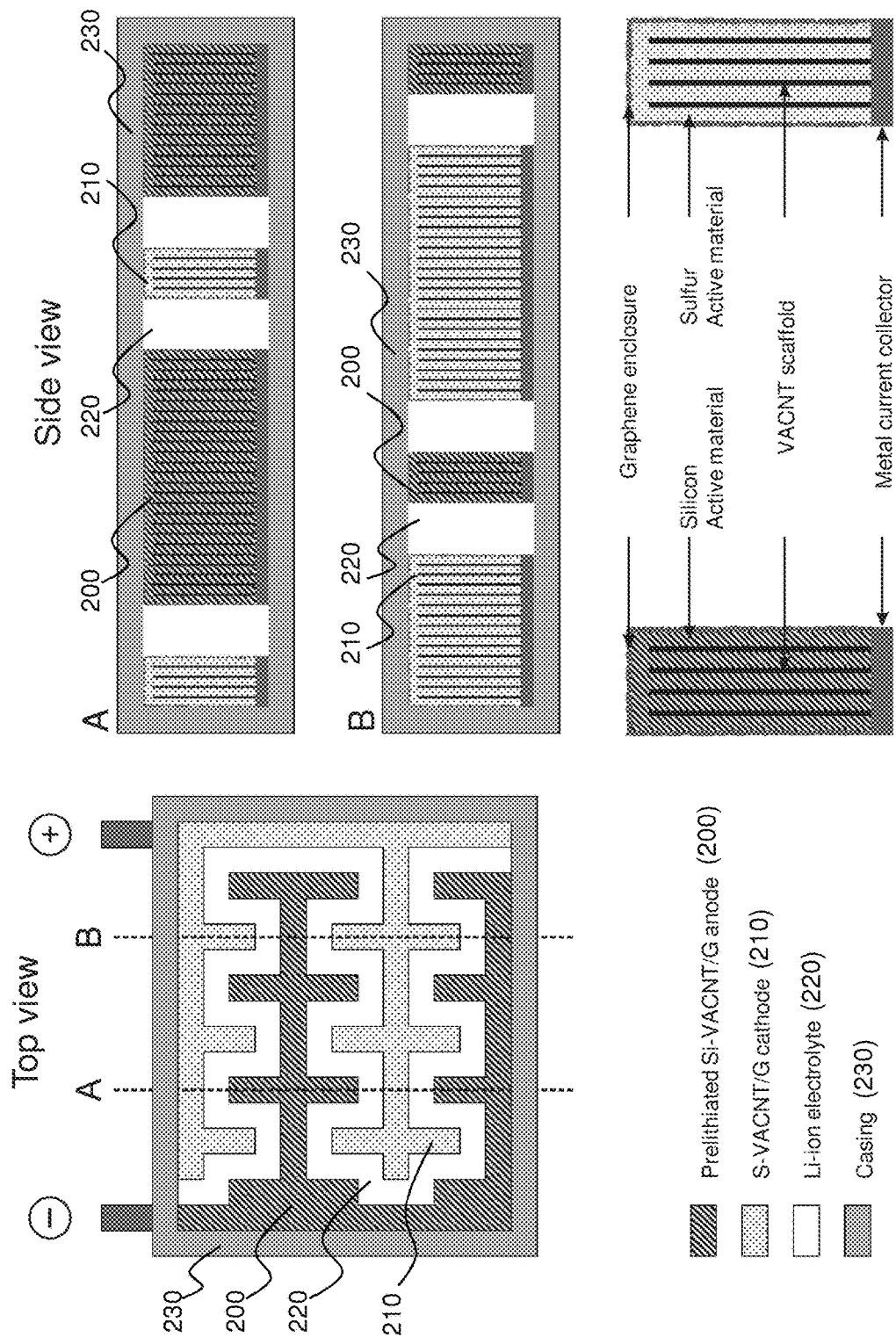
FIG. 2A. A schematic diagram showing top and side views of a separator free silicon—sulfur battery. A shown in this figure, the battery uses carbon nanotubes—graphene hybrid structures as the scaffolds and enclosures, and silicon and sulfur as the active electrode materials. The cathode and anode are patterned in a specific configuration such that both of them are on the same plane but without touching each other, eliminating the need to use separator.
Figure 2B:
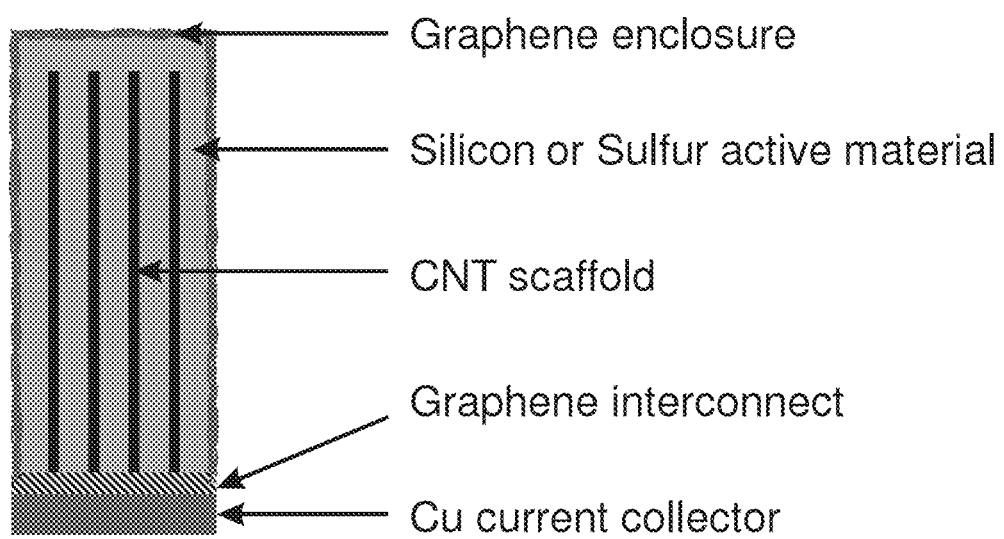
FIG. 2B. A schematic diagram showing an electrode configuration useful for certain embodiments of the invention.

As described earlier, in some embodiments both cathode and anode are patterned in a specific configuration such that both of them are on the same plane without touching each other. One example of this configuration is shown in FIG. 2A providing a schematic diagram showing top and side views of a separator free silicon—sulfur battery. A shown in this figure, the battery uses carbon nanotubes—graphene hybrid structures as the scaffolds and enclosures, and silicon and sulfur as the active electrode materials. The cathode and anode are patterned in a specific configuration such that both of them are on the same plane but without touching each other, eliminating the need to use separator. FIG. 2B provides an alternative electrode configuration include a graphene interconnect provided between the carbon nanotube assembly and the current collector, for example, to minimize ESR and protect the current collector (e.g., Cu foil).

Figure 3:
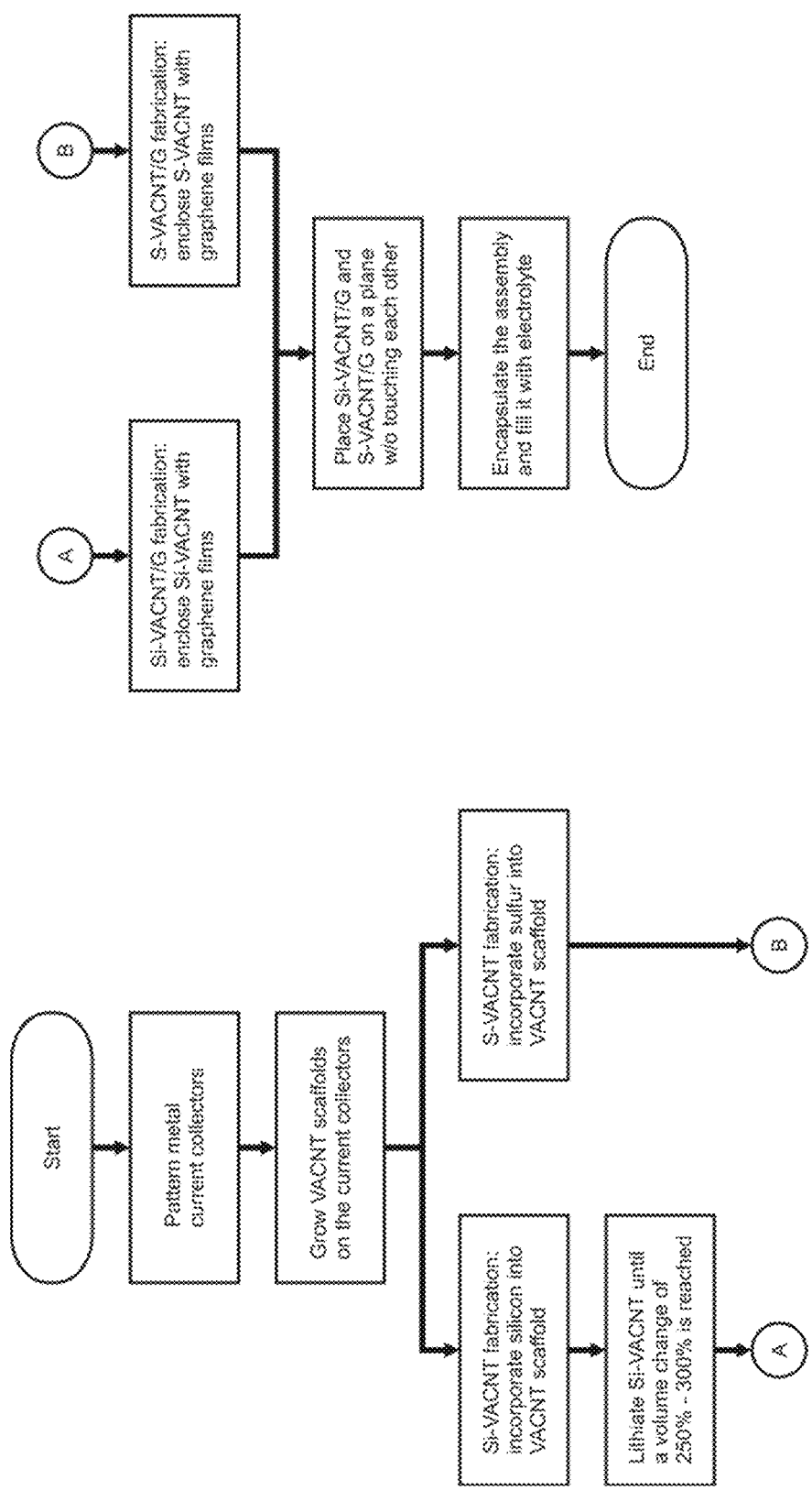
FIG. 3. Flow chart to fabricate a separator free silicon—sulfur battery using carbon nanotubes—graphene hybrid structures as the scaffolds and enclosures, and silicon and sulfur as the active electrode materials.

FIG. 3 provides a flow chart describing a process to fabricate a separator free silicon—sulfur battery using carbon nanotubes—graphene hybrid structures as the scaffolds and enclosures, and silicon and sulfur as the active electrode materials. Since the shape and position of both cathode and anode is dictated by that of VACNT scaffolds, it is beneficial for some applications to start the fabrication process by patterning the current collector and grow the VACNT scaffolds directly on it. The metal current collector can be patterned using well known microfabrication techniques such as lithography, physical vapor deposition, and electroplating. VACNT scaffolds can then be directly grown on the current collector by chemical vapor deposition.[5] In an embodiment, metal current collectors are patterned on a substrate and VACNT assemblies are grown on the current collectors, for example, by exposing a patterned nanotube catalyst to a nanotube precursor. Next, active materials for positive and negative electrodes are provided to the nanotube assemblies, and optionally electrochemically prelithiated. Optionally, separate graphene enclosures are provided at least partially enclosing the active materials of the positive and negative electrodes. Alternatively, for some embodiments, VACNT assemblies are generated on graphene films which are subsequently transferred to be in electrical contact with current collectors patterned onto a substrate to fabricate the electrochemical cell.

Figure 4:
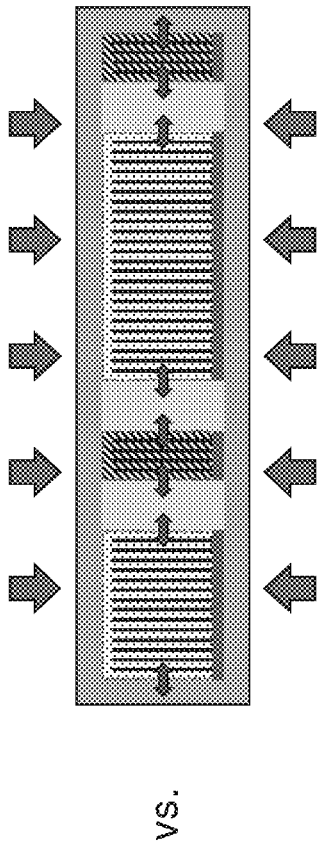
FIG. 4. A schematic diagram showing advantages of using carbon nanotubes—graphene hybrid structures against typical thin film configuration. Carbon nanotubes—graphene hybrid structures allow the use of very thick films of silicon and sulfur active materials without escalating their internal electrical resistance. They also allow silicon and sulfur to expand and contract freely during the charging and discharging cycles, so that stress and strain induced by volume change of silicon do not act against sulfur and vice versa.
Figure 4:
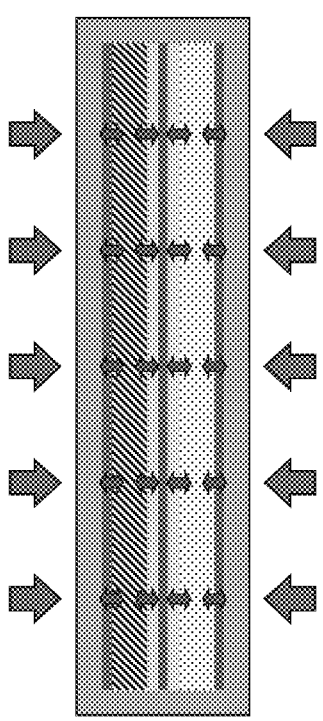

FIG. 4 provides a schematic diagram showing advantages of using carbon nanotubes—graphene hybrid structures as compared to a conventional thin film configuration. Carbon nanotubes—graphene hybrid structures allow the use of very thick films of silicon and sulfur active materials without escalating their internal electrical resistance. They also allow silicon and sulfur to expand and contract freely during the charging and discharging cycles, so that stress and strain induced by volume change of silicon do not act against sulfur and vice versa. Advantages of the present electrode configurations include: (i) the ability to allow Si and S active materials to expand and contract freely, (ii) forces induced by volume change of Si and S active materials do not act against each other, thereby preventing a short circuit to occur, (ii) better electrical conductivity and thermal dissipation, thereby allowing high loading of Si and S active materials to achieve higher capacity and minimizing risk of thermal runaway.

It is important to note that VACNT scaffolds allow the use of very thick films of silicon and sulfur active materials, up to several mm (e.g., 3 mm), without escalating their internal electrical resistance (FIG. 4). The aforementioned configuration also allows the need for a separator, typically placed between anode and cathode, to be completely eliminated. The high loading of silicon and sulfur along with the absence of a separator result in a high value of MR and VR, which ultimately bring the actual specific energy of the battery closer to the theoretical specific energy of just the active electrode materials. In addition, this configuration allows silicon and sulfur to expand and contract freely during the charging and discharging cycles. Thus, stress and strain induced by volume change of the cathode do not act against the anode and vice versa (FIG. 4).

Silicon can be incorporated into VACNT scaffolds using previously published methods (FIG. 3). These methods include chemical vapor deposition using silane precursor,[6,7] dispersion of silicon nanoparticles and nanowires,[8] and physical vapor deposition using sputtering and evaporation.[9] Once the silicon has been successfully incorporated into VACNT (Si-VACNT), the next step is the insertion of lithium ion into the silicon by electrochemical reaction (FIG. 3). Here the Si-VACNT is connected to a lithium metal foil or stabilized lithium metal powders (SLMP) in the presence of electrolyte.[1,10] Ideally, the prelithiation process occurs spontaneously when the Si-VACNT is in direct contact with lithium metal foil or SLMP. However, overpotential can also be used when the Si-VACNT is not readily intercalated by lithium ions upon contact. In this case, the Si-VACNT is charged by connecting it to the negative side of a DC power supply while a lithium metal foil is connected to the positive side. Care must be taken so that the Si-VACNT is not overlithiated, which may result in fracture and loss of structural integrity. In principle, a successful prelithiation process of Si-VACNT is indicated by a volume change of about 250%-300%.

Once Si-VACNT electrodes have been successfully prelithiated, they can then be encapsulated by graphene enclosures to improve the cycle life and the overall battery efficiency (FIG. 3). Graphene enclosures can be deposited onto Si-VACNT by simply drop-casting and drying a dispersion of graphene films directly onto the anodes. A dispersion of graphene films in a liquid can be made using previously published methods.[11,12] During the charge-discharge cycles the graphene enclosures constrain the volume change of the Si-VACNT, preventing silicon from being fractured and disconnected from the VACNT scaffolds. Since graphene enclosures are electrically and ionically conductive, they minimize the internal resistance of the Si-VACNT while simultaneously allowing electrochemical reaction to occur. The graphene encapsulated Si-VACNT (Si-VACNT/G) electrodes are readily used as anodes in lithium ion batteries.

Similarly, sulfur can be incorporated into VACNT scaffolds using previously published methods (FIG. 3). These methods include infusion of molten sulfur and/or sulfur containing solutions into the inter-tube spacing of VACNT.[13-15] In principle, a successful sulfur infusion process is indicated by a weight change of about 300%-350%. Once VACNT scaffolds have been completely infused by sulfur (S-VACNT), they can then be encapsulated by graphene enclosures. During the charge-discharge cycles the graphene enclosures prevent a direct contact between electrolyte and polysulfides formed in the S-VACNT. Thus, dissolution of polysulfides into the electrolyte can be avoided while simultaneously allowing electrochemical reaction to occur. This ultimately improves cycle life and minimizes the rapid fading in capacity of the S-VACNT. In addition, graphene enclosures also reduce the internal resistance of the S-VACNT to ultimately improve the overall battery efficiency. The graphene encapsulated S-VACNT (S-VACNT/G) electrodes are readily used as anodes in lithium ion batteries.

REFERENCES

1 Liu, N., Hu, L., McDowell, M. T., Jackson, A. & Cui, Y. Prelithiated Silicon Nanowires as an Anode for Lithium Ion Batteries. *ACS Nano* 5, 6487-6493, doi:10.1021/nn2017167 (2011).
2 He, G., Ji, X. & Nazar, L. High "C" rate Li—S cathodes: sulfur imbibed bimodal porous carbons. *Energy & Environmental Science* 4, 2878-2883, doi:10.1039/C1EE01219C (2011).
3 Yang, Y. et al. New Nanostructured Li2S/Silicon Rechargeable Battery with High Specific Energy. *Nano letters* 10, 1486-1491, doi:10.1021/nl100504q (2010).
4 Gogotsi, Y. & Simon, P. True Performance Metrics in Electrochemical Energy Storage. *Science* 334, 917-918, doi:10.1126/science.1213003 (2011).
5 Aria, A. I. & Gharib, M. Reversible Tuning of the Wettability of Carbon Nanotube Arrays: The Effect of Ultraviolet/Ozone and Vacuum Pyrolysis Treatments. *Langmuir* 27, 9005-9011, doi:10.1021/la201841m (2011).
6 Evanoff, K. et al. Towards Ultrathick Battery Electrodes: Aligned Carbon Nanotube—Enabled Architecture. *Advanced Materials* 24, 533-537, doi:10.1002/adma.201103044 (2012).
7 Forney, M. W. et al. High performance silicon freestanding anodes fabricated by low-pressure and plasma-enhanced chemical vapor deposition onto carbon nanotube electrodes. *Journal of Power Sources* 228, 270-280, doi:http://dx.doi.org/10.1016/j.jpowsour.2012.11.109 (2013).
8 Cui, L.-F., Hu, L., Choi, J. W. & Cui, Y. Light-Weight Free-Standing Carbon Nanotube-Silicon Films for Anodes of Lithium Ion Batteries. *ACS Nano* 4, 3671-3678, doi:10.1021/nn100619m (2010).
9 Katar, S. et al. Silicon Encapsulated Carbon Nanotubes. *Nanoscale Res. Lett.* 5, 74-80 (2009).
10 Forney, M. W., Ganter, M. J., Staub, J. W., Ridgley, R. D. & Landi, B. J. Prelithiation of Silicon-Carbon Nanotube Anodes for Lithium Ion Batteries by Stabilized Lithium Metal Powder (SLMP). *Nano Letters* 13, 4158-4163, doi:10.1021/nl401776d (2013).
11 Zhang, X. et al. Dispersion of graphene in ethanol using a simple solvent exchange method. *Chemical Communications* 46, 7539-7541, doi:10.1039/C00002688C (2010).
12 Pu, N.-W. et al. Dispersion of graphene in aqueous solutions with different types of surfactants and the production of graphene films by spray or drop coating. *Journal of the Taiwan Institute of Chemical Engineers* 43, 140-146, doi:http://dx.doi.org/10.1016/j.jtice.2011.06.012 (2012).
13 Zheng, G., Yang, Y., Cha, J. J., Hong, S. S. & Cui, Y. Hollow Carbon Nanofiber-Encapsulated Sulfur Cathodes for High Specific Capacity Rechargeable Lithium Batteries. *Nano Letters* 11, 4462-4467, doi:10.1021/nl2027684 (2011).
14 Su, Y.-S., Fu, Y. & Manthiram, A. Self-weaving sulfur-carbon composite cathodes for high rate lithium-sulfur batteries. *Physical Chemistry Chemical Physics* 14, 14495-14499, doi:10.1039/C2CP42796F (2012).
15 Dorfler, S. et al. High capacity vertical aligned carbon nanotube/sulfur composite cathodes for lithium-sulfur batteries. *Chemical Communications* 48, 4097-4099, doi:10.1039/C2CC17925C (2012).

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, and method steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individually or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that, any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

We claim:

1. An electrochemical cell comprising:
   a negative electrode comprising a first assembly of carbon nanotubes supporting a silicon active material filling spaces between the nanotubes;
   a positive electrode comprising a second assembly of carbon nanotubes supporting a sulfur active material;
   an electrolyte provided between said positive electrode and said negative electrode; said electrolyte capable of conducting charge carriers; and
   a substrate;
   wherein said first assembly of carbon nanotubes and said second assembly of carbon nanotubes are physically separated from each other and are supported by said substrate; and
   wherein said first assembly of carbon nanotubes is provided as one or more first strips supported by said substrate and said second assembly of carbon nanotubes is provided as one or more second strips supported by said substrate, said one or more first strips and said one or more second strips arranged in a space filling geometry selected from a group of geometries consisting of an interleaved geometry, a nested geometry, a coiled geometry, and a spiral geometry.

2. The electrochemical cell of claim 1, wherein said charge carriers are Li+ ions; and wherein said positive electrode and said negative electrode accommodate said Li+ ions during charge or discharge of said electrochemical cell.

3. The electrochemical cell of claim 1, wherein said silicon active material, said sulfur active material or both are prelithiated.

4. The electrochemical cell of claim 1, wherein said electrochemical cell does not include a separator.

5. The electrochemical cell of claim 1, wherein said first assembly of carbon nanotubes and said second assembly of carbon nanotubes are physically separated from each other by at least 10 μm.

6. The electrochemical cell of claim 1, wherein said first assembly of carbon nanotubes is provided on a first current collector supported by said external surface of said substrate and said second assembly of carbon nanotubes is provided on a second current collector supported by said external surface of said substrate.

7. The electrochemical cell of claim 6, further comprising a first graphene electrical interconnect and a second graphene interconnect, wherein said first graphene electrical interconnect is provided between said first assembly of carbon nanotubes and said first current collector; and wherein said second graphene electrical interconnect is provided between said second assembly of carbon nanotubes and said second current collector.

8. The electrochemical cell of claim 1, wherein said first strips are separated from said second strips by at least 10 µm; and wherein said first strips and said second strips are characterized by widths selected from the range of 10 µm to 1 mm and lengths selected from the range of 30 µm to 3 mm.

9. The electrochemical cell of claim 1, wherein said carbon nanotubes of said first assembly and said second assembly comprise single walled carbon nanotubes, multi-walled carbon nanotubes, metallic carbon nanotubes or any combination of these; and wherein said carbon nanotubes of said first assembly and said second assembly are independently characterized by radial dimensions selected over the range of 5 nm to 100 nm, length dimensions selected over the range of 10 µm to 5 mm and an average surface concentration greater than or equal to 25 nanotubes per µm$^{-2}$.

10. The electrochemical cell of claim 1, wherein said carbon nanotubes of said first assembly and said second assembly comprise one or more carbon nanotube arrays or carbon nanotube networks.

11. The electrochemical cell of claim 1, wherein said carbon nanotubes of said first assembly comprise a first array of vertically aligned carbon nanotubes and said carbon nanotubes of said second assembly comprise a second array of vertically aligned carbon nanotubes.

12. The electrochemical cell of claim 11, wherein said vertically aligned carbon nanotubes of said first array and said second array extend in one or more directions away from said common surface.

13. The electrochemical cell of claim 11, wherein said vertically aligned carbon nanotubes of said first array and said second array extend in a common direction away from said common surface.

14. The electrochemical cell of claim 11, wherein said vertically aligned carbon nanotubes of said first array and said second array are independently characterized by an average interspacing between adjacent nanotubes selected over the range of 10 nm to 200 nm.

15. The electrochemical cell of claim 1, wherein said carbon nanotubes of said first assembly provide a mechanical scaffold capable of accommodating stress resulting from expansion of said silicon active material or said sulfur active material during charging or discharge of said electrochemical cell so as to allow a reversible change in volume of said negative electrode or said positive electrode greater than or equal to 200% without mechanical failure.

16. The electrochemical cell of claim 1, wherein said silicon active material comprises elemental silicon or an alloy thereof and wherein said sulfur active material comprises elemental sulfur.

17. The electrochemical cell of claim 1, wherein said silicon active material and said sulfur active material independently comprise a single crystalline material, a polycrystalline material or amorphous material and wherein said silicon active material is provided on said carbon nanotubes of said first assembly or said sulfur active material is provided on said carbon nanotubes of said second assembly by a process selected from the group consisting physical vapor deposition, chemical vapor deposition, sputtering, electrodeposition, solution casting, liquid infusion and liquid deposition.

18. The electrochemical cell of claim 1, wherein said silicon active material at least partially coats said carbon nanotubes of said first assembly, said sulfur active material at least partially coats said carbon nanotubes of said second assembly or wherein said silicon active material at least partially coats said carbon nanotubes of said first assembly and said sulfur active material at least partially coats said carbon nanotubes of said second assembly.

19. The electrochemical cell of claim 1, wherein said silicon active material provides a coating on at least a portion of said carbon nanotubes of said first assembly having a thickness greater than or equal to 0.1 µm or wherein said sulfur active material provides a coating on at least a portion of said carbon nanotubes of said second assembly having a thickness greater than or equal to 0.1 µm.

20. The electrochemical cell of claim 1, further comprising a first graphene layer at least partially enclosing said silicon active material of said negative electrode, a second graphene layer at least partially enclosing said sulfur active material of said positive electrode or both.

21. The electrochemical cell of claim 20, wherein said first graphene layer and said second graphene layer are each permeable to Li+ charge carriers and each independently have an average thickness selected over the range of 5 nm to 100 nm.

22. The electrochemical cell of claim 20, wherein said first graphene layer or said second graphene layer provide an elastic barrier with said electrolyte capable of accommodating expansion or contraction of the volume of said silicon active material of said negative electrode or said sulfur active material of said positive electrode.

23. The electrochemical cell of claim 20, wherein said first graphene layer or said second graphene layer provide a chemical barrier capable of preventing transport of one or more reaction products from said silicon active material of said negative electrode or said sulfur active material of said positive electrode and said electrolyte.

24. The electrochemical cell of claim 23, wherein said second graphene layer prevents transport of polysulfides generated at said sulfur active materials of said positive electrode to said electrolyte.

25. The electrochemical cell of claim 1, wherein said electrolyte is a liquid phase electrolyte, gel electrolyte or a solid phase electrolyte having an ionic conductivity for said charge carriers greater than or equal to 1.5 S cm$^{-1}$.

26. The electrochemical cell of claim 1, comprising a secondary electrochemical cell.

27. The electrochemical cell of claim 1, comprising a lithium ion battery.

28. The electrochemical cell of claim 1, having a specific energy greater than or equal to about 387.5 Wh kg$^{-1}$, or a standard cell voltage equal to or greater than 1.35 V or a cycle life equal to or greater than about 1000 cycles.

29. The electrochemical cell of claim 1, wherein said first assembly of carbon nanotubes and said second assembly of carbon nanotubes are independently provided on an external surface of said substrate, or on one or more intermediate structures provided between said first assembly of carbon nanotubes or said second assembly of carbon nanotubes and said external surface of said substrate.

30. The electrochemical cell of claim 1, wherein said one or more first strips and said one or more second strips arranged in the nested geometry.

31. The electrochemical cell of claim 1, wherein said one or more first strips and said one or more second strips arranged in the interleaved geometry, wherein one of the positive or negative electrodes comprises recessed features and the other of the positive or negative electrodes comprises projecting features.

\* \* \* \* \*